United States Patent
Ang et al.

(10) Patent No.: US 10,819,655 B2
(45) Date of Patent: Oct. 27, 2020

(54) BANDWIDTH PART SIGNALING AND SWITCHING

(71) Applicant: QUALCOMM Incorporated, San Diego, CA (US)

(72) Inventors: Peter Pui Lok Ang, San Diego, CA (US); Wanshi Chen, San Diego, CA (US); Peter Gaal, San Diego, CA (US); Heechoon Lee, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/196,862

(22) Filed: Nov. 20, 2018

(65) Prior Publication Data
US 2019/0166066 A1    May 30, 2019

Related U.S. Application Data

(60) Provisional application No. 62/654,107, filed on Apr. 6, 2018, provisional application No. 62/590,517, filed on Nov. 24, 2017.

(51) Int. Cl.
*H04L 12/913* (2013.01)
*H04L 5/00* (2006.01)
(Continued)

(52) U.S. Cl.
CPC .......... *H04L 47/724* (2013.01); *H04L 5/0078* (2013.01); *H04L 5/1469* (2013.01);
(Continued)

(58) Field of Classification Search
CPC ... H04L 47/724; H04L 5/0078; H04L 5/1469; H04L 47/821; H04W 72/042; H04W 72/0453
(Continued)

(56) References Cited

U.S. PATENT DOCUMENTS

2019/0103953 A1*  4/2019  Liao ...................... H04W 76/28
2019/0132109 A1*  5/2019  Zhou ................... H04W 72/042
(Continued)

OTHER PUBLICATIONS

Ericsson: "On Remaining Details of CSI Reporting", 3GPP Draft, R1-1720734 on Remaining Details of CSI Reporting, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051370191, 11 Pages, Retrieved from the Internet: URL:http://www.3gpp.org/ftp/tsg%5Fran/WG1%5FRL1/TSGR1%5F91/Docs/ [retrieved on Nov. 18, 2017].
(Continued)

*Primary Examiner* — Obaidul Huq
(74) *Attorney, Agent, or Firm* — Harrity & Harrity, LLP/Qualcomm

(57) ABSTRACT

Various aspects of the present disclosure generally relate to wireless communication. In some aspects, a user equipment may determine a bandwidth part switch from a first bandwidth part to a second bandwidth part. The user equipment may transition from the first bandwidth part to the second bandwidth part after determining the bandwidth part switch and based at least in part on a critical section defined for the transitioning from the first bandwidth part to the second bandwidth part. Numerous other aspects are provided.

30 Claims, 19 Drawing Sheets

(51) Int. Cl.
*H04L 5/14* (2006.01)
*H04L 12/911* (2013.01)
*H04W 72/04* (2009.01)

(52) U.S. Cl.
CPC ......... *H04L 47/821* (2013.01); *H04W 72/042* (2013.01); *H04W 72/0453* (2013.01)

(58) Field of Classification Search
USPC ........................................ 370/310, 328, 329
See application file for complete search history.

(56) References Cited

U.S. PATENT DOCUMENTS

| 2019/0132862 | A1* | 5/2019 | Jeon | H04W 72/14 |
| 2019/0141695 | A1* | 5/2019 | Babaei | H04L 5/001 |
| 2019/0150183 | A1* | 5/2019 | Aiba | H04W 24/10 |
| | | | | 370/336 |
| 2019/0158229 | A1* | 5/2019 | Wei | H04L 1/1848 |

OTHER PUBLICATIONS

International Search Report and Written Opinion—PCT/US2018/062176—ISA/EPO—dated Feb. 14, 2019.

Mediatek Inc: "Remaining Details on Bandwidth Part Operation in NR", 3GPP Draft, R1-1719551_Remaining Details on Bandwidth Part Operation in NR, 3rd Generation Partnership Project (3GPP), Mobile Competence Centre, 650, Route Des Lucioles, F-06921 Sophia-Antipolis Ced, vol. RAN WG1, No. Reno, USA, Nov. 27, 2017-Dec. 1, 2017, Nov. 18, 2017 (Nov. 18, 2017), XP051369365, 10 Pages, Retrieved from the Internet: URL:http://www.3gpp.org/ftp/tsg%5Fran/WG1%5FRL1/TSGR1%5F91/Docs/ [retrieved on Nov. 18, 2017].

Qualcomm Incorporated: "Open Issues on BWP", 3GPP Draft, R1-1720693 Open Issues on BWP, 3rd Generation Partnership Project (3GPP), Mobile Competence Centre, 650, Route Des Lucioles, F-06921 Sophia-Cedex, France, vol. RAN WG1, No. Reno, NV, USA, Nov. 27, 2017-Dec. 1, 2017, Nov. 18, 2017 (Nov. 18, 2017), XP051370154, pp. 1-15, Retrieved from the Internet: URL:http://www.3gpp.org/ftp/tsg%5Fran/WG1%5FRL1/TSGR1%5F91/Docs/ [retrieved on Nov. 18, 2017].

* cited by examiner

BANDWIDTH PART SIGNALING AND SWITCHING

CROSS-REFERENCE TO RELATED APPLICATIONS UNDER 35 U.S.C. § 119

This application claims priority to U.S. Provisional Application No. 62/590,517, filed on Nov. 24, 2017, entitled "TECHNIQUES AND APPARATUSES FOR BANDWIDTH PART SIGNALING AND SWITCHING," which is hereby expressly incorporated by reference herein.

This application claims priority to U.S. Provisional Application No. 62/654,107, filed on Apr. 6, 2018, entitled "TECHNIQUES AND APPARATUSES FOR BANDWIDTH PART SIGNALING AND SWITCHING," which is hereby expressly incorporated by reference herein.

FIELD OF THE DISCLOSURE

Aspects of the present disclosure generally relate to wireless communication, and more particularly to techniques and apparatuses for bandwidth part signaling and switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include determining, by a user equipment (UE), a bandwidth part switch from a first bandwidth part to a second bandwidth part. The method may include transitioning, by the UE, from the first bandwidth part to the second bandwidth part after determining the bandwidth part switch and based at least in part on a critical section defined for the transitioning from the first bandwidth part to the second bandwidth part.

In some aspects, a user equipment for wireless communication may include memory and one or more processors operatively coupled to the memory. The memory and the one or more processors may be configured to determine a bandwidth part switch from a first bandwidth part to a second bandwidth part. The memory and the one or more processors may be configured to transition from the first bandwidth part to the second bandwidth part after determining the bandwidth part switch and based at least in part on a critical section defined for the transitioning from the first bandwidth part to the second bandwidth part.

In some aspects, a non-transitory computer-readable medium may store one or more instructions for wireless communication. The one or more instructions, when executed by one or more processors of a user equipment, may cause the one or more processors to determine a bandwidth part switch from a first bandwidth part to a second bandwidth part. The one or more instructions, when executed by the one or more processors, may cause the one or more processors to transition from the first bandwidth part to the second bandwidth part after determining the bandwidth part switch and based at least in part on a critical section defined for the transitioning from the first bandwidth part to the second bandwidth part.

In some aspects, an apparatus for wireless communication may include means for determining a bandwidth part switch from a first bandwidth part to a second bandwidth part. The apparatus may include means for transitioning from the first bandwidth part to the second bandwidth part after determining the bandwidth part switch and based at least in part on a critical section defined for the transitioning from the first bandwidth part to the second bandwidth part.

Aspects generally include a method, apparatus, device, computer program product, non-transitory computer-readable medium, user equipment, wireless communication device, base station, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
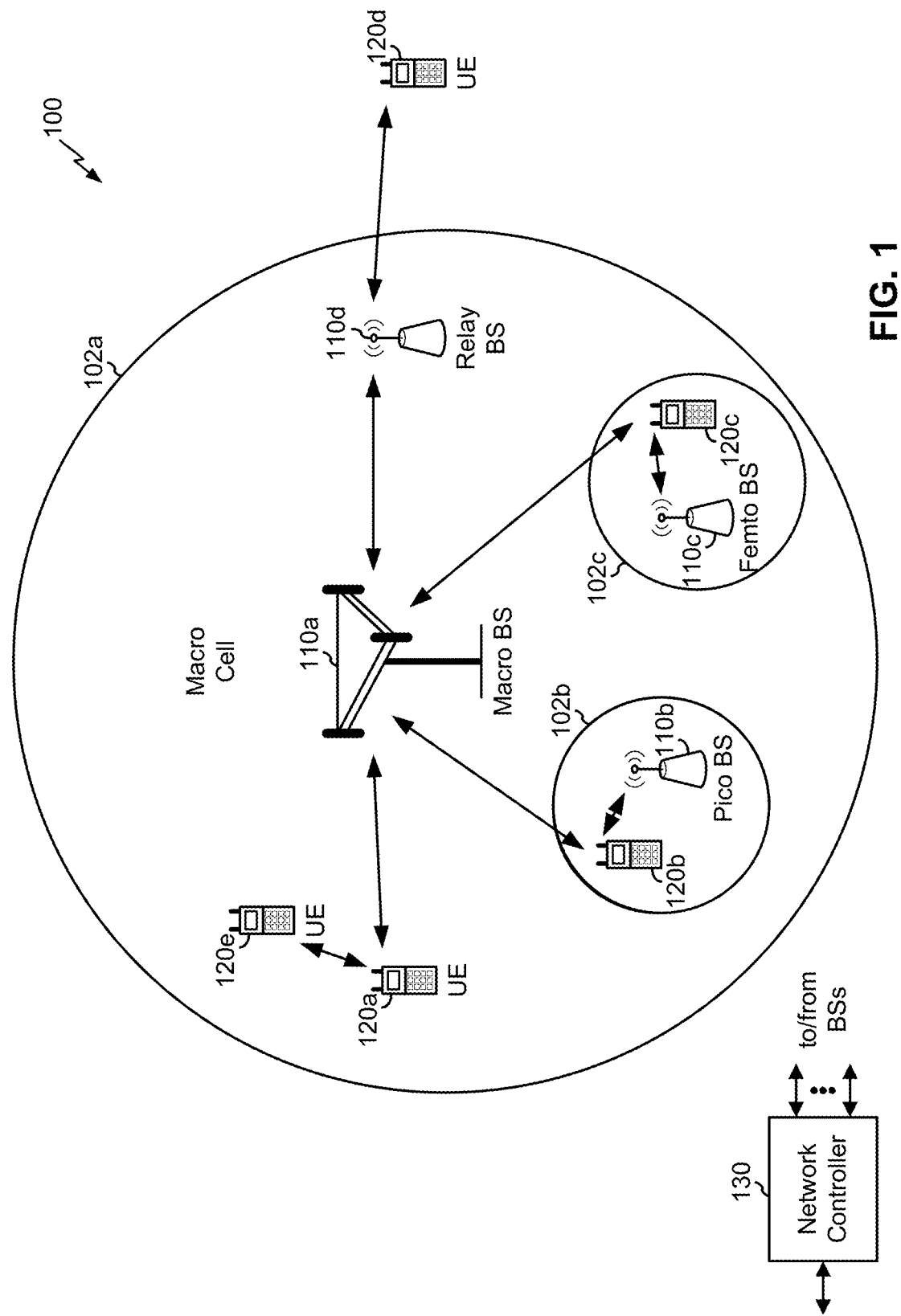
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as the Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
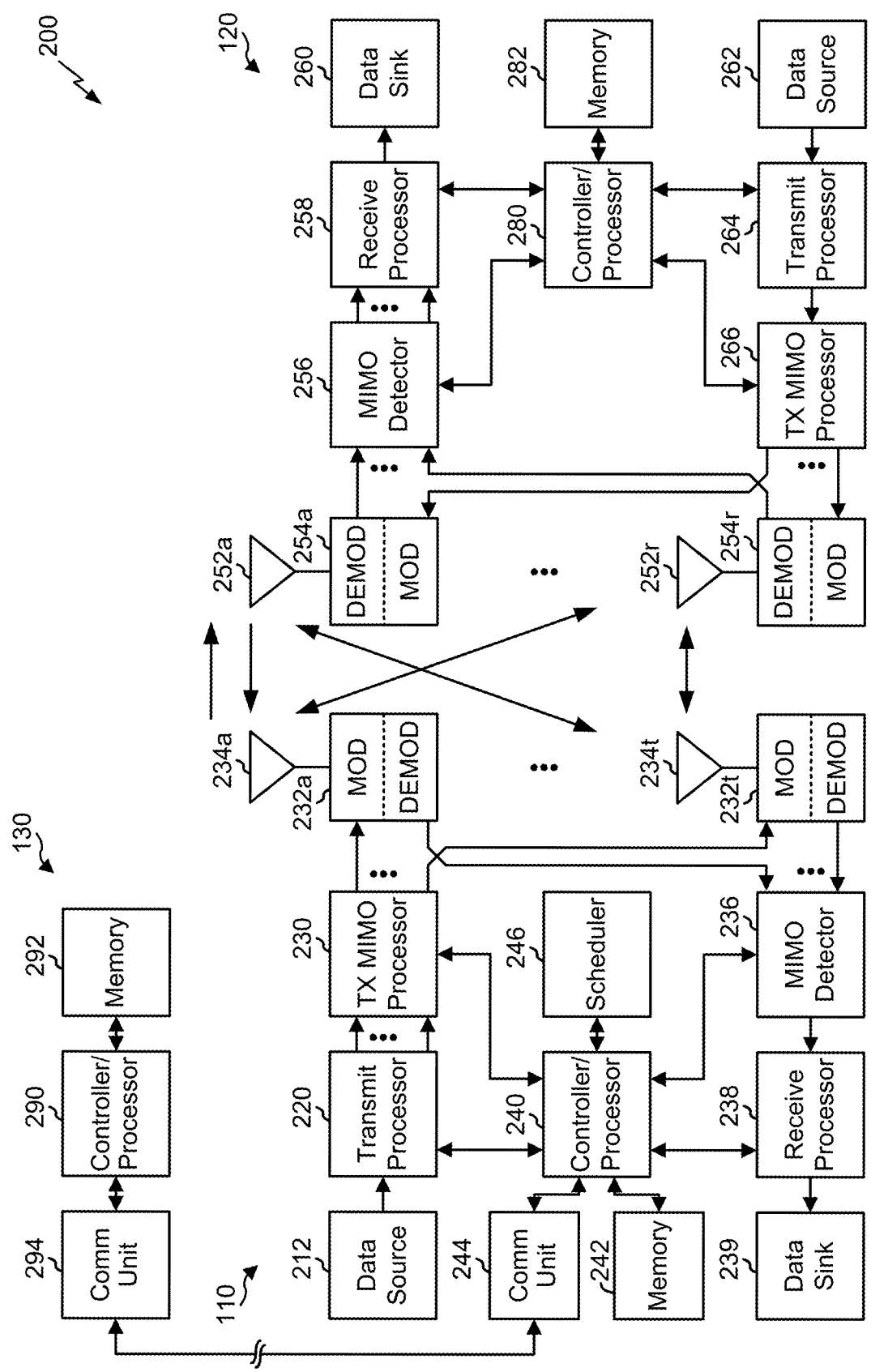
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with bandwidth part signaling and switching, as described in more detail elsewhere herein. For example, controller/processor 240 of base station 110, controller/processor 280 of UE 120, and/or any other component(s) of FIG. 2 may perform or direct operations of, for example, process 1300 of FIG. 13 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a bandwidth part switch from a first bandwidth part to a second bandwidth part, means for transitioning from the first bandwidth part to the second bandwidth part after determining the bandwidth part switch and based at least in part on a critical section defined for the transitioning from the first bandwidth part to the second bandwidth part, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
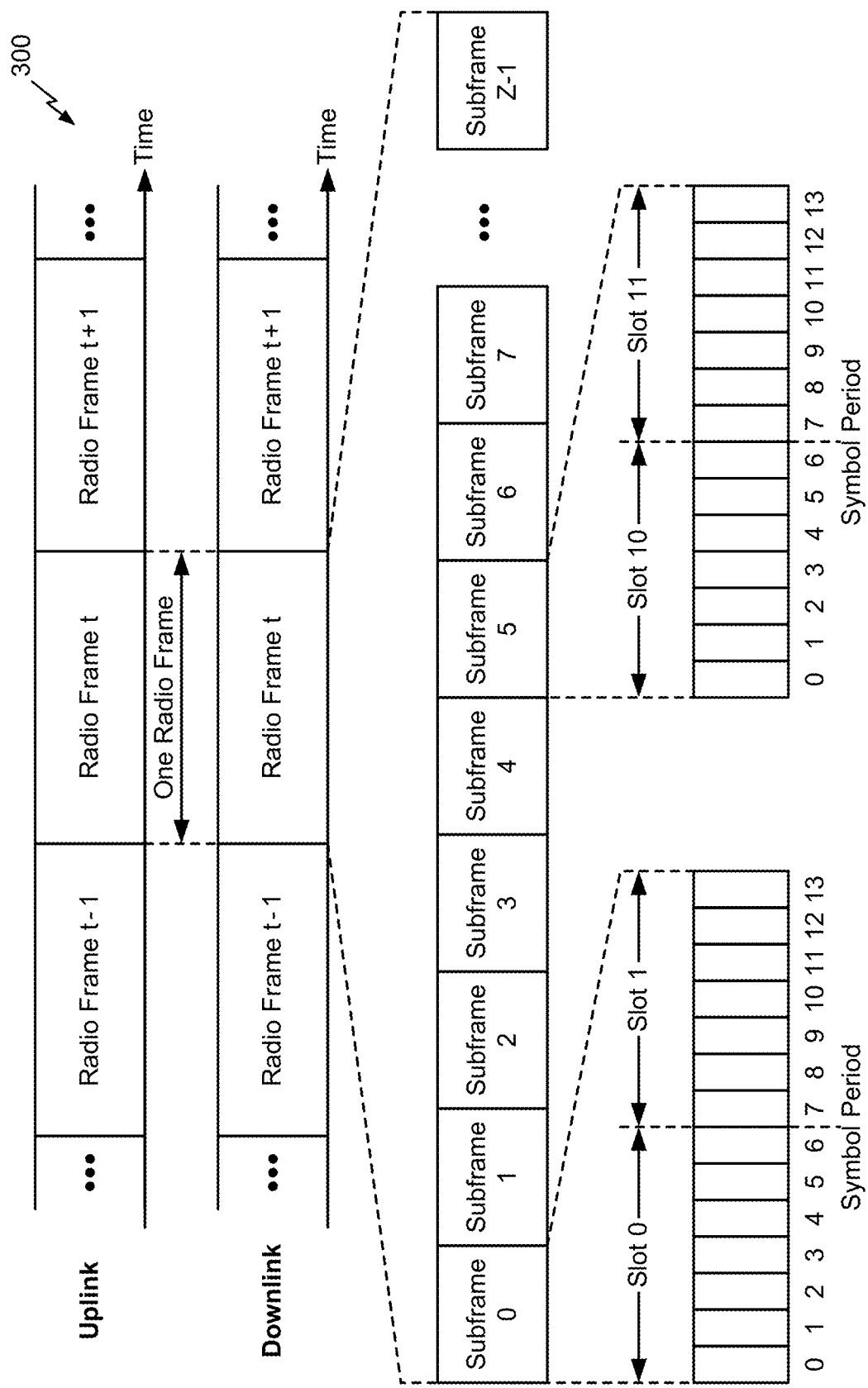
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
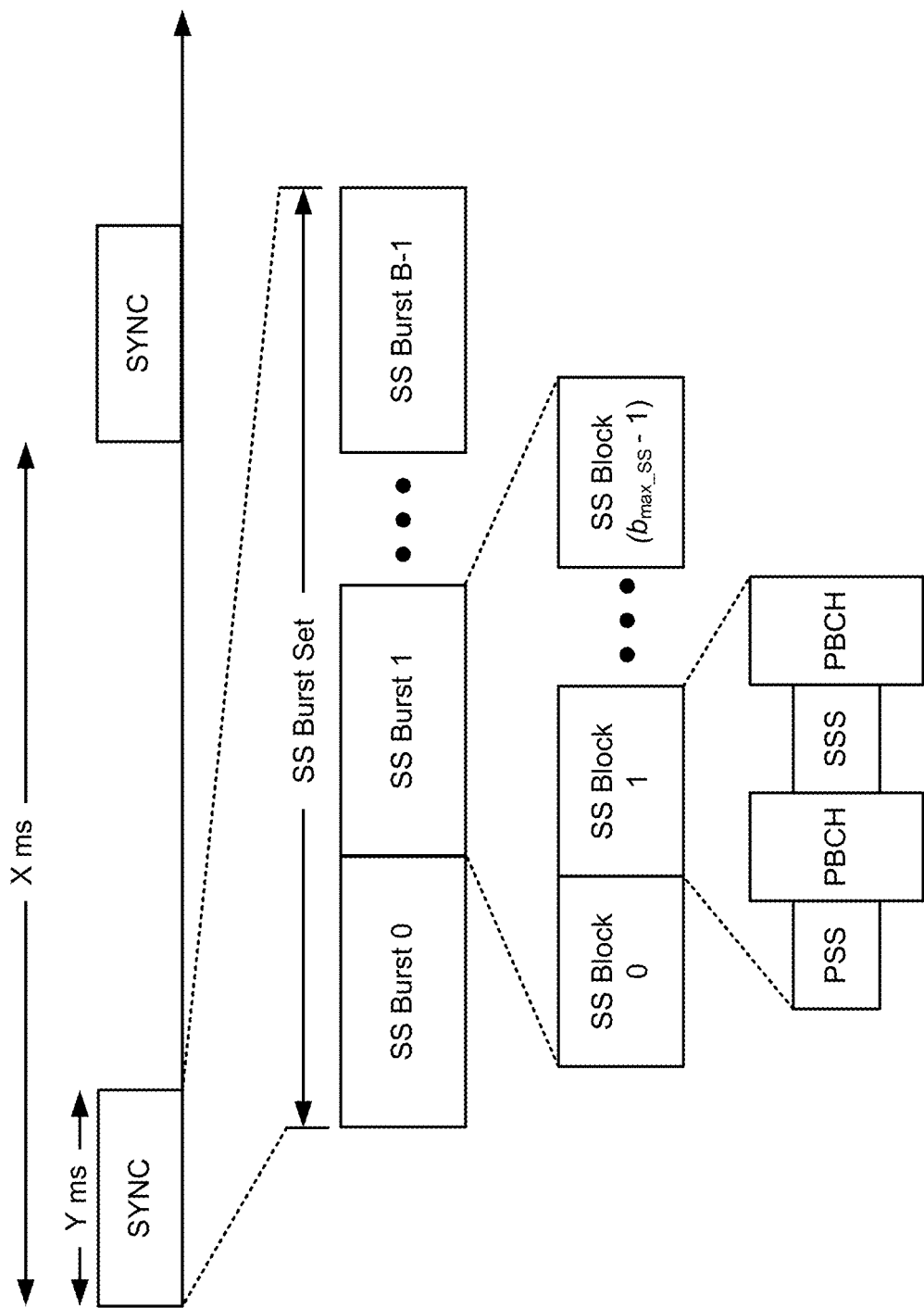
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
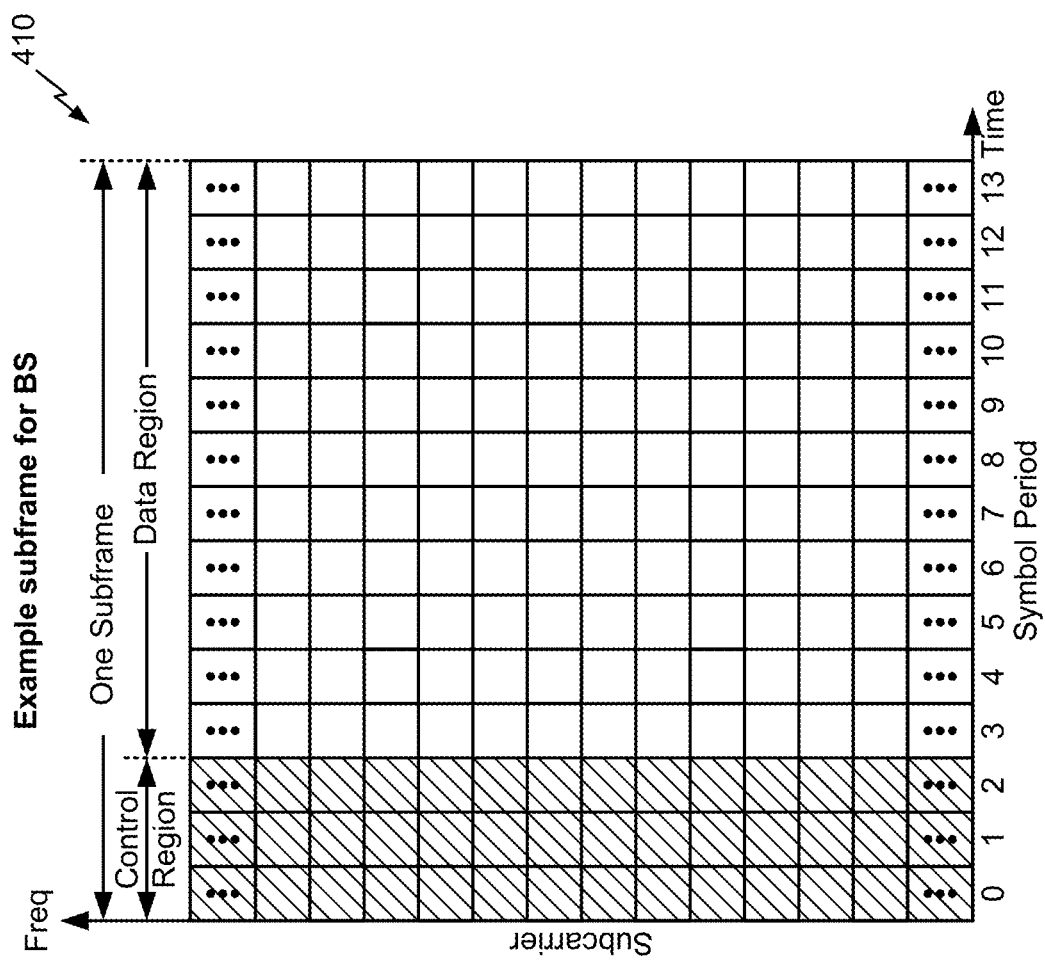
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

FIGS. 5-8 are diagrams illustrating example scenarios 500, 600, 700, and 800 associated with bandwidth part management, in accordance with various aspects of the present disclosure.

New Radio (NR) supports the use of multiple different numerologies (e.g., subcarrier spacing options of 15 kHz, 30 kHz, 60 kHz, 120 kHz, and/or the like) and multiple different slot durations (e.g., 0.5 ms, 0.25 ms, 0.125 ms, and/or the like). Furthermore, a wideband bandwidth (e.g., a system bandwidth and/or the like) in NR may be up to 100 MHz (e.g., for the sub-6 GHz frequency band), up to 400 MHz (e.g., for a frequency band above 6 GHz), and/or the like. In some cases, there may be scenarios where a UE only monitors or is only served with a subset of the wideband bandwidth. This subset may be referred to as a bandwidth part, and may be limited due to a UE capability, due to a UE being in a power saving mode, and/or the like.

Figure 5:
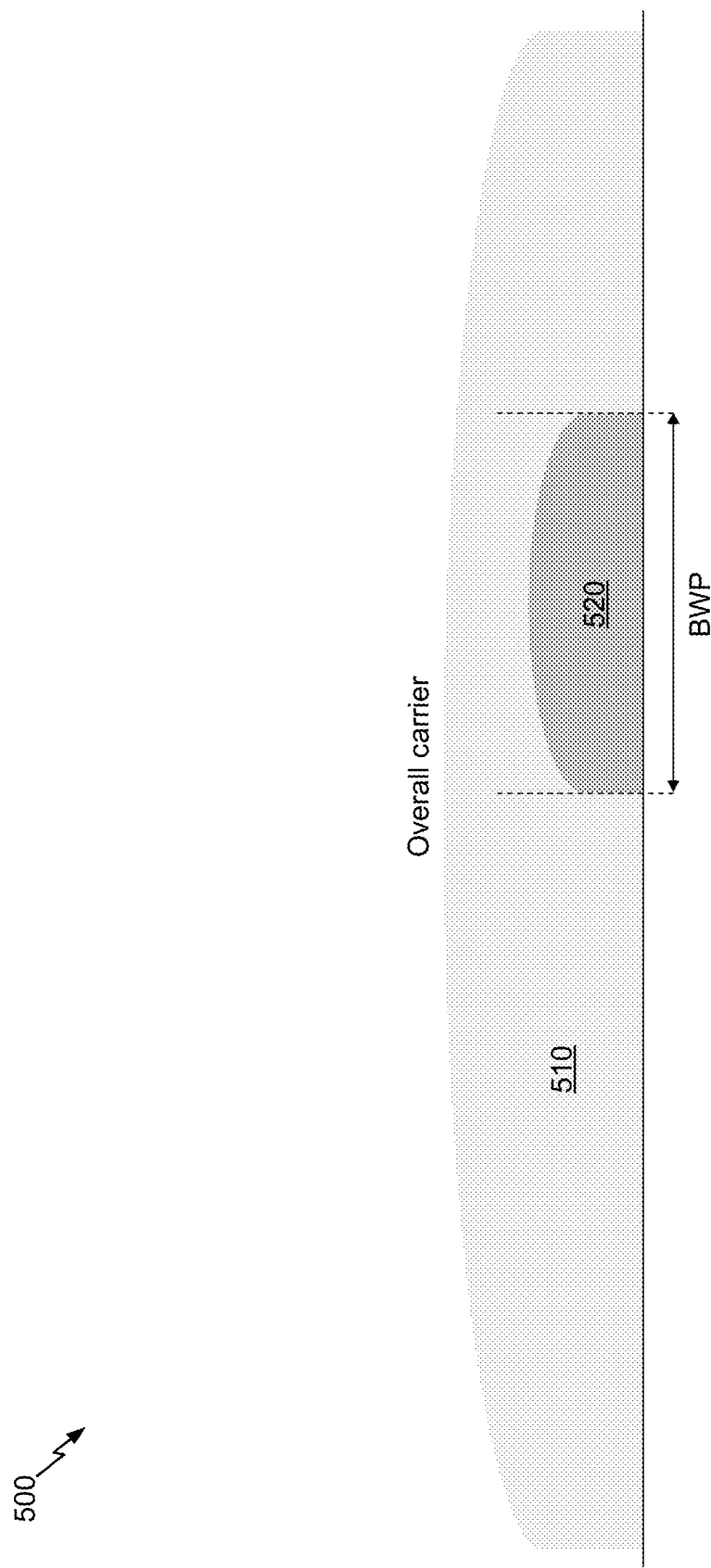
FIGS. 5-8 are diagrams illustrating example scenarios associated with bandwidth part management, in accordance with various aspects of the present disclosure.

For example, as shown in FIG. 5, an overall carrier 510 may span a wideband bandwidth, and a bandwidth part (BWP) 520 may span a portion of the overall carrier 510. For example, the bandwidth part 520 may be less than the overall carrier 510 due to a UE capability, such as a reduced UE bandwidth capability. As a more specific example, the UE may be an NB-IoT UE with a limited bandwidth capability.

Figure 6:
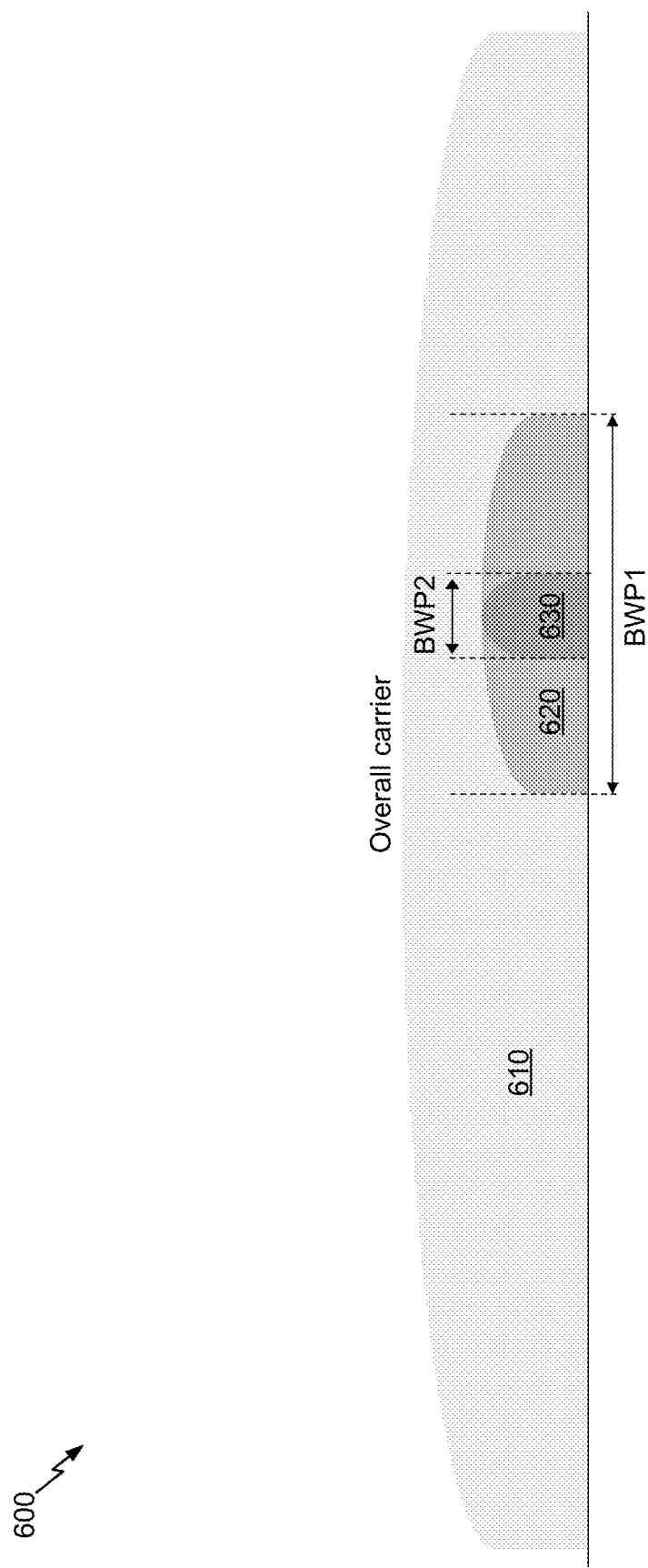

As another example, and as shown in FIG. 6, an overall carrier 610 may span a wideband bandwidth, a first bandwidth part (BWP1) 620 may span a portion of the overall carrier 610, and a second bandwidth part (BWP2) 630 may span a portion of the first bandwidth part. In this case, the first bandwidth part 620 may represent a UE bandwidth capability, and the second bandwidth part 630 may represent a bandwidth to be monitored by or served to the UE. For example, the UE may be capable of communicating over the entire first bandwidth part 620, but may be configured to communicate only in the second bandwidth part 630 (e.g., for a time period) to conserve battery power. In this case, the UE may be capable of transitioning between a full bandwidth configuration, where the UE monitors or is served on the first bandwidth part 620, and a bandwidth part configuration where the UE monitors or is served on the second bandwidth part 630. For example, the UE may transition to the full bandwidth configuration when the UE is scheduled to transmit or receive data (e.g., a threshold amount of data), and may transition to the bandwidth part configuration to conserve battery power when the UE is not scheduled to transmit or receive data.

Figure 7:
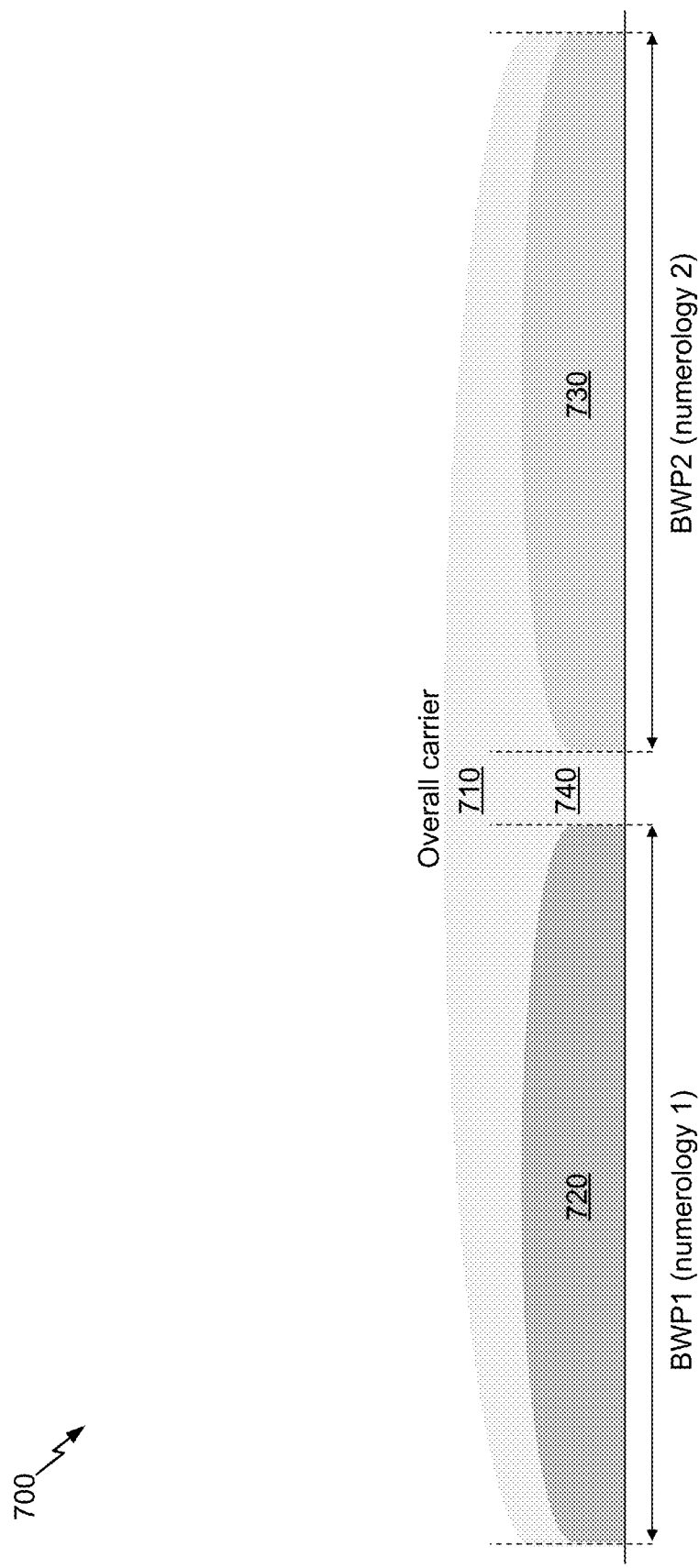

As another example, and as shown in FIG. 7, an overall carrier 710 may span a wideband bandwidth, which may be partitioned into multiple bandwidth parts, such as a first bandwidth part (BWP1) 720 and a second bandwidth part (BWP2) 730. The bandwidth parts 720, 730 may each span a portion of the overall carrier 710. In some aspects, different bandwidth parts may be associated with different numerologies, such as 15 kHz, 30 kHz, 60 kHz, 120 kHz, and/or the like. Additionally, or alternatively, a guard band 740 (e.g., a gap) may be configured between different bandwidth parts to reduce interference between bandwidth parts and/or numerologies.

Figure 8:
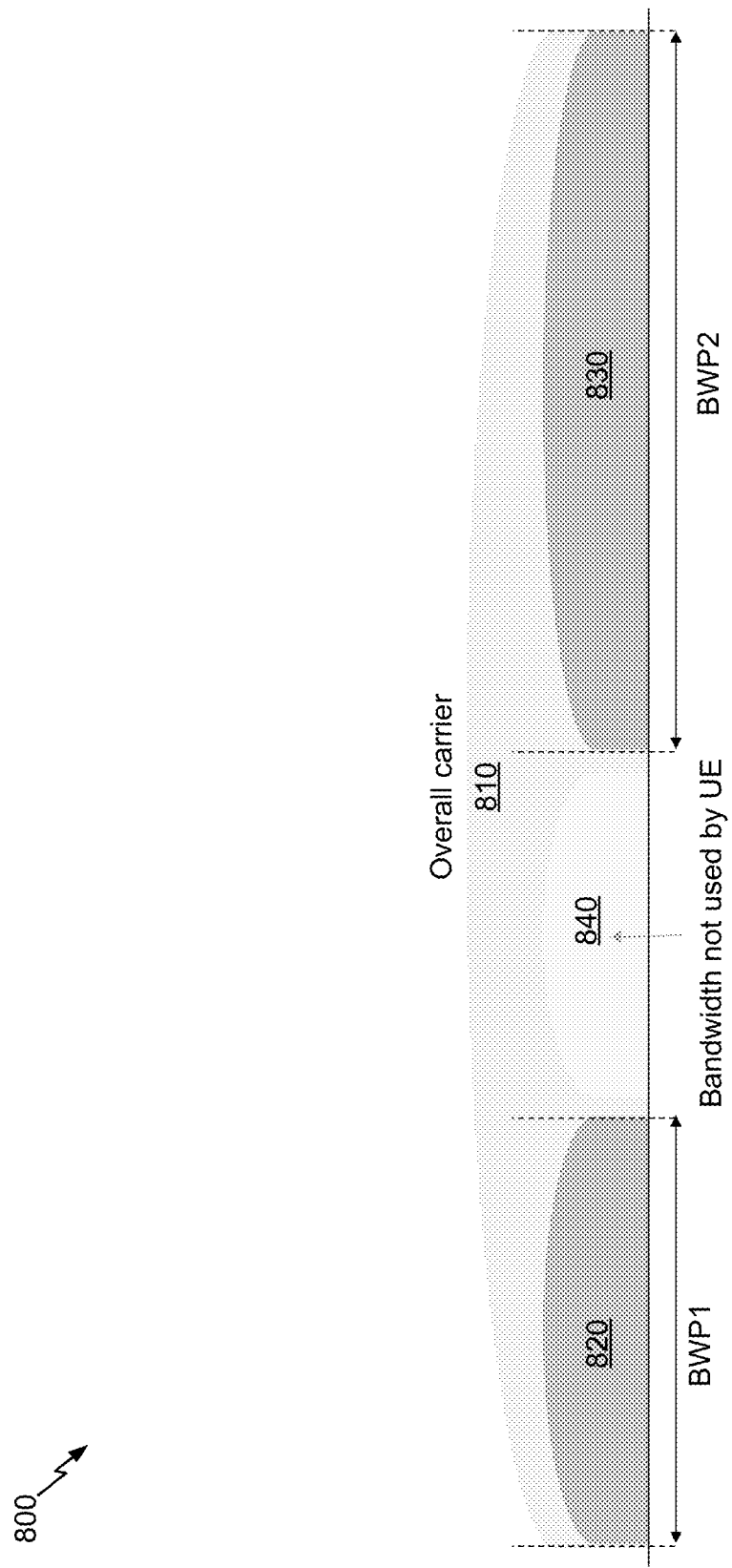

As another example, and as shown in FIG. 8, an overall carrier 810 may span a wideband bandwidth, which may be partitioned into multiple bandwidth parts, such as a first bandwidth part (BWP1) 820 and a second bandwidth part (BWP2) 830. Further, the overall carrier 810 may include a third bandwidth part 840 not used by the UE. For example, the first bandwidth part 820 and the second bandwidth part 830 may be associated with the same network operator, and/or may be used to support intra-band carrier aggregation, while the third bandwidth part 840 may be associated with a different network operator and/or may not be used for carrier aggregation. In some implementations, a synchronization signal (SS) block (e.g., which includes one or more of a PSS, an SSS, a PBCH, and/or the like) may be transmitted on one bandwidth part, and may include information for multiple bandwidth parts to conserve network resources.

In some aspects, a carrier, such as carrier 810 and/or the like, may include bandwidth part pairs. A bandwidth part pair may include a downlink bandwidth part and an uplink bandwidth part that share a common center frequency. In this case, a UE may be configured to transfer between a first bandwidth part pair and a second bandwidth part pair, a first bandwidth part of a first bandwidth part pair and a second bandwidth part of a second bandwidth part pair (without transitioning from a second bandwidth part of the first bandwidth part pair), and/or the like.

While different types of bandwidth parts are described in connection with the scenarios of FIGS. 5-8, techniques described herein relate to signaling and switching for bandwidth parts. For example, a UE may receive an indication that the UE is to switch from a first bandwidth part to a second bandwidth part, and the UE may transition from the first bandwidth part to the second bandwidth part. In some aspects, the UE and a BS may define a critical section for a period of time during which a bandwidth part switch is to occur, and may transition from the first bandwidth part to the second bandwidth part based at least in part on one or more defined behaviors associated with the critical section.

As indicated above, FIGS. 5-8 are provided as examples. Other examples are possible and may differ from what was described in connection with FIGS. 5-8.

Figure 9A:
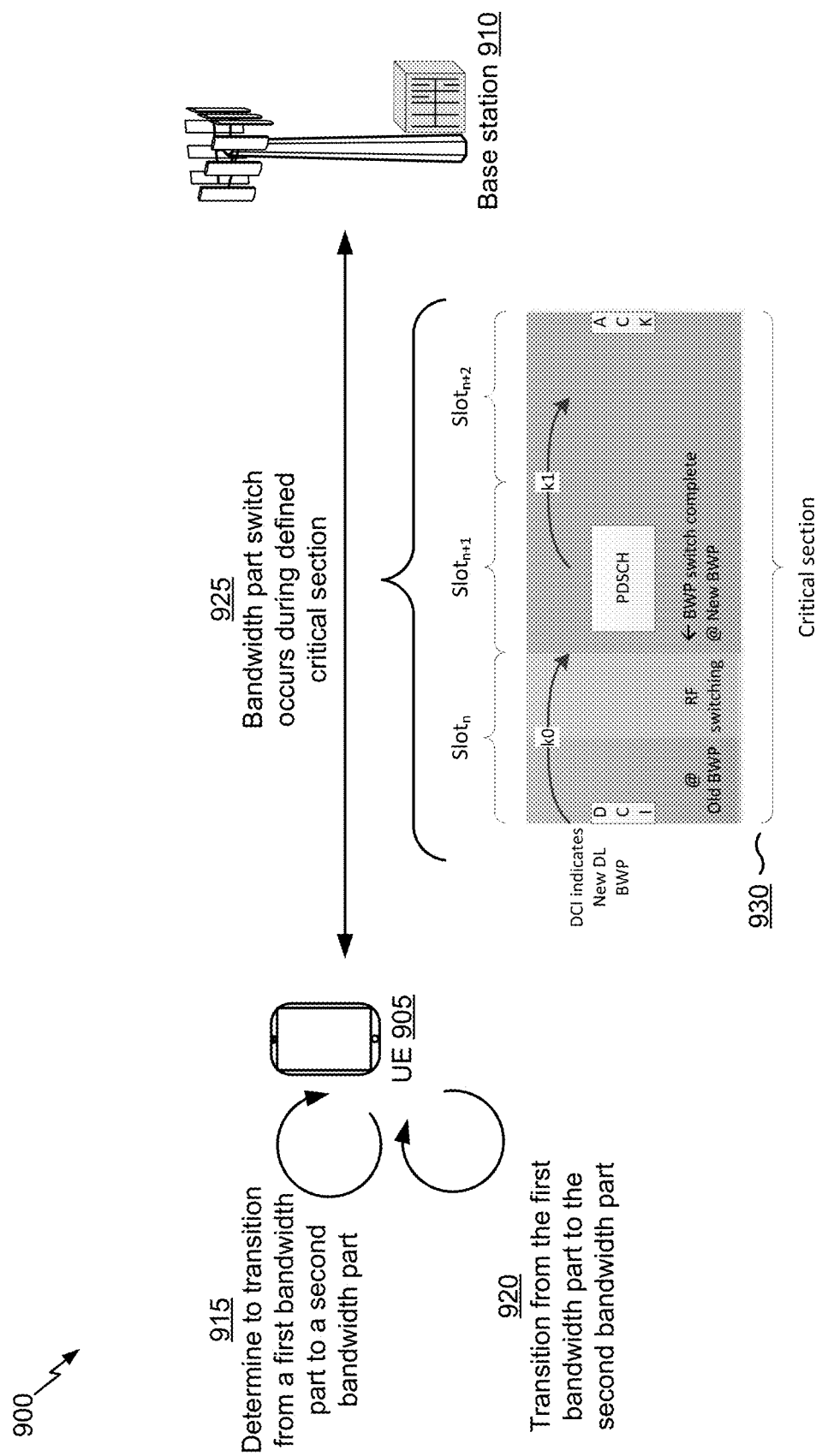
FIGS. 9A-9D are diagrams illustrating example scenarios associated with bandwidth part management, in accordance with various aspects of the present disclosure.

FIGS. 9A-9D are diagrams illustrating example scenarios 900 of bandwidth part signaling and switching, in accordance with various aspects of the present disclosure. As shown in FIG. 9A, a UE 905 may communicate with a base station 910. In some aspects, the UE 905 may correspond to one or more UEs described elsewhere herein, such as UE 120 and/or the like. Additionally, or alternatively, the base station 910 may correspond to one or more base stations described elsewhere herein, such as the base station 110 and/or the like.

As further shown in FIG. 9A, and by reference number 915, UE 905 may determine to transition from a first bandwidth part to a second bandwidth part in a time division duplex communication system. For example, based at least in part on receiving a downlink control information message, based at least in part on a timer expiring, and/or the like, UE 905 may determine to transition from the first bandwidth part to the second bandwidth part. As shown by reference number 920, UE 905 may transition from the first bandwidth part to the second bandwidth part. For example, UE 905 may transition from a first portion of a carrier associated with the first bandwidth part to a second portion of the carrier associated with the second bandwidth part after determining to transition and based at least in part on a defined critical section associated with one or more defined behaviors for UE 905 during a bandwidth part switch.

As further shown in FIG. 9A, and by reference number 925, the bandwidth part switch may occur during the defined critical section. The defined critical section may be associated with a transition timeline 930 for a downlink bandwidth part switch. As shown, the critical section may be defined from a downlink control information (DCI) message received by UE 905 and associated with scheduling a physical downlink shared channel (PDSCH) and triggering the bandwidth part switch. In some aspects, the critical section may continue to an uplink control information message including an acknowledgement message (ACK) provided by UE 905. In some aspects, the critical section may be associated with a set of time periods, such as a first time period $k_0$ from the downlink control information message to a physical downlink shared channel allocation, and a second time period $k_1$ from the physical downlink shared channel allocation to the acknowledgment message. For example, the first period may relate to a radio frequency switching latency and the second time period may relate to a shared channel allocation.

In some aspects, the critical section may be associated with a plurality of slots. For example, the critical section may be defined for a first slot (Slot$_n$), which includes a portion of the first bandwidth part (@Old BWP) and a transition period (RF switching); a second slot (Slot$_{n+1}$), which includes a portion of the second bandwidth part (@New BWP); a third slot (Slot$_{n+2}$), which includes another portion of the second bandwidth part; and/or the like.

In some aspects, UE 905 may set a minimum value for a bandwidth part timer to avoid an error. For example, when the bandwidth part timer is less than a threshold (e.g. $k_0+k_1$ for downlink, $k_2$ for uplink, as described herein, and/or the like), the bandwidth part timer may expire during the critical section. Thus, UE 905 may use the threshold as a minimum value for the bandwidth part timer to avoid another bandwidth part switch being triggered during a bandwidth part switch. In some aspects, UE 905 may start the critical section based at least in part on the bandwidth part timer, thereby avoiding a conflict with a downlink control information message triggering a bandwidth part switch. In some aspects, UE 905 may trigger a bandwidth part switch for a bandwidth part pair (e.g., a paired uplink bandwidth part and downlink bandwidth part).

Although the defined critical section, described herein, may be described in terms of a single serving cell for a UE (e.g., UE 905), the critical section may be used for a UE associated with a plurality of bandwidth parts for a plurality of cells (e.g., for carrier aggregation). For example, when there is a bandwidth part switch on a first carrier, a critical section may be defined for one or more second carriers. In this case, the critical section may be applied to the first carrier, the one or more second carriers, and/or the like.

Figure 9B:
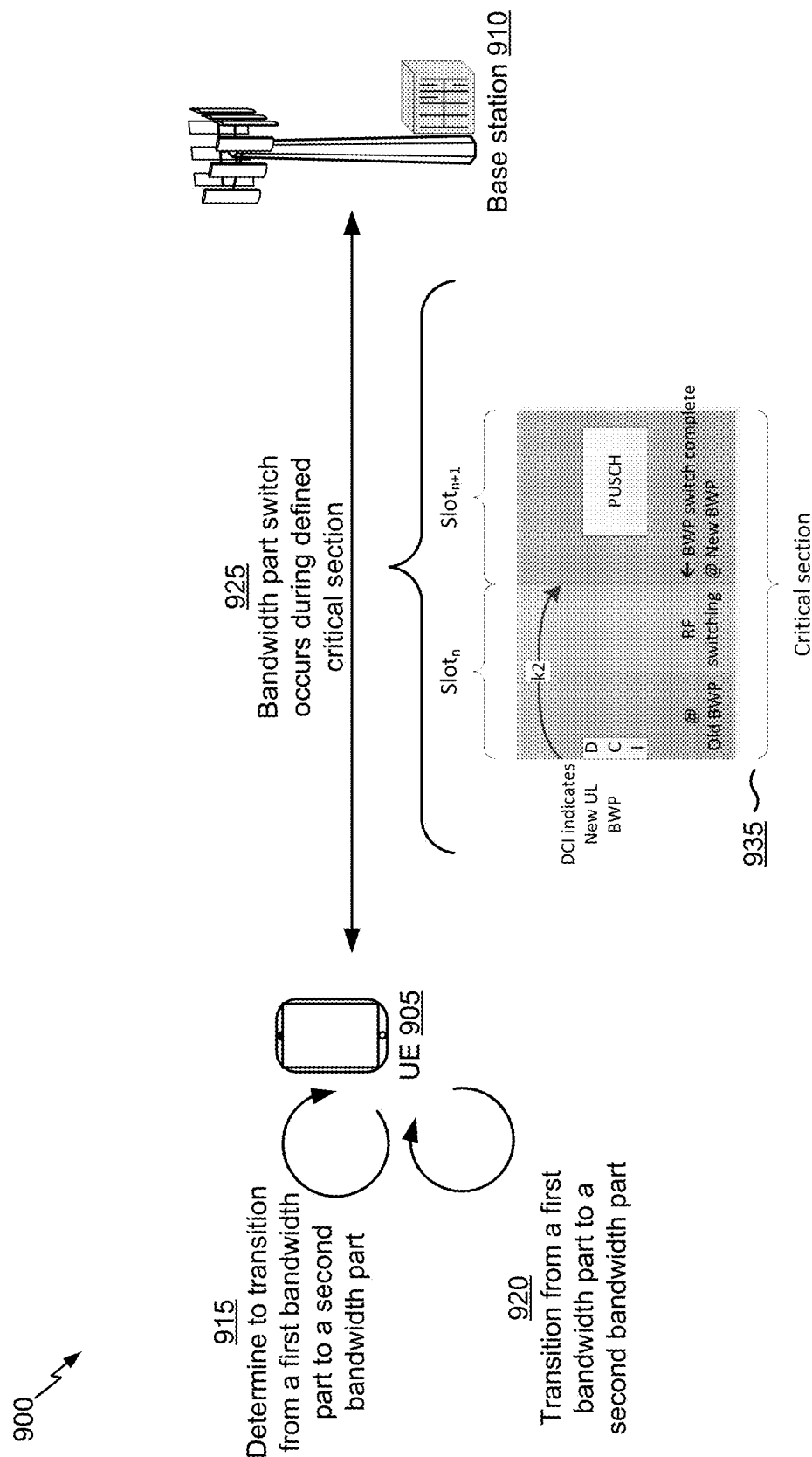

As shown in FIG. 9B, the defined critical section may be associated with a transition timeline 935 for an uplink bandwidth part switch. As shown, the critical section may be defined from a downlink control information (DCI) message received by UE 905 and associated with scheduling of a physical uplink shared channel (PUSCH) and triggering the bandwidth part switch. In some aspects, the critical section may continue to the physical uplink shared channel (PUSCH) allocated for UE 905. In some aspects, the critical section may be associated with a time period $k_2$ from the downlink control information message to the transition to the second bandwidth part and relating to a radio frequency switching latency. In some aspects, the critical section may be associated with a plurality of slots. For example, the critical section may be defined for a first slot (Slot$_n$), which includes a portion of the first bandwidth part (@Old BWP), a transition period (RF switching; a second slot (Slot$_{n+1}$), which includes a portion of the second bandwidth part (@New BWP); and/or the like.

Figure 9C:
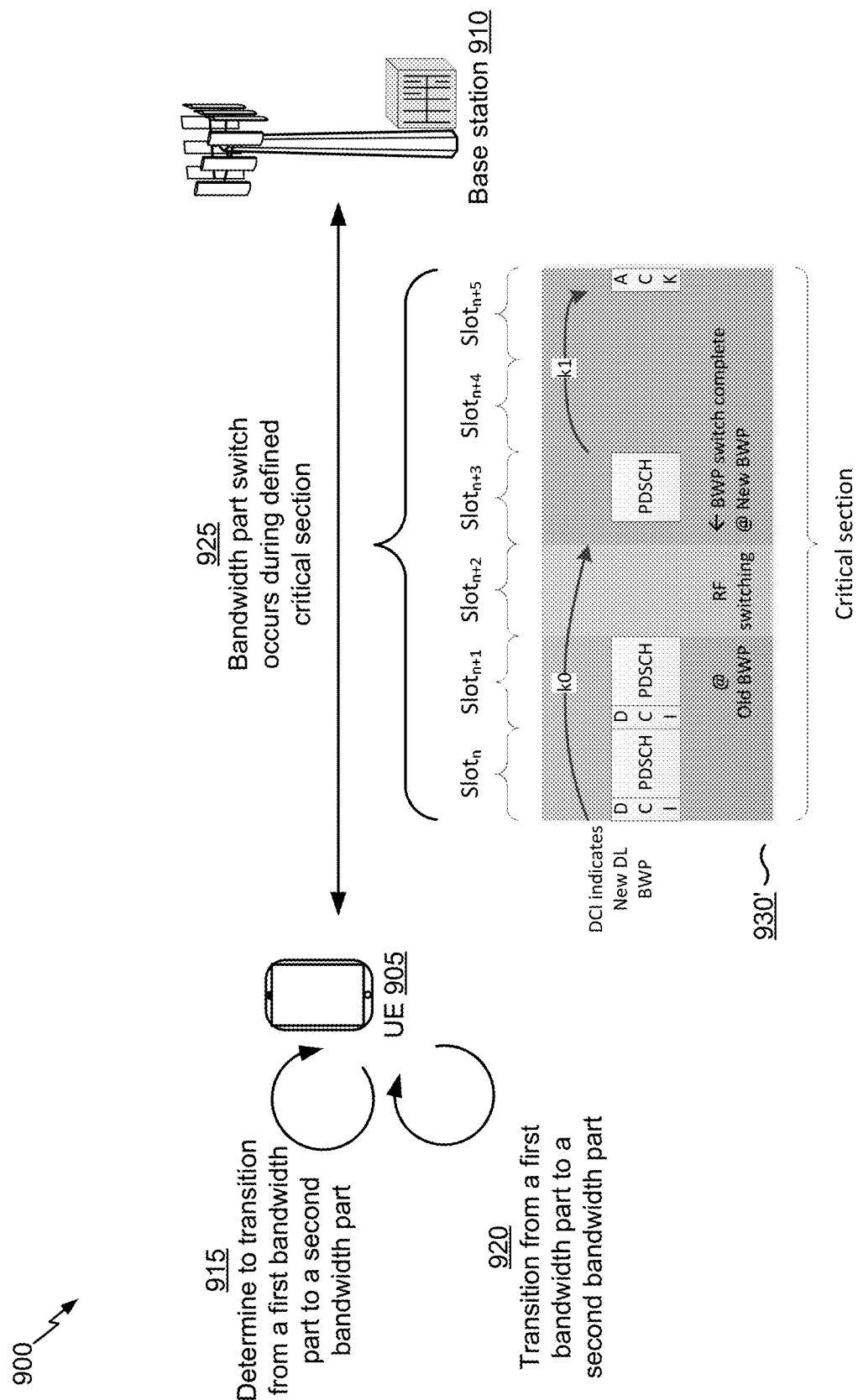

As shown in FIG. 9C, the defined critical section may be associated with a transition timeline 930' for the downlink bandwidth part switch. For example, UE 905 may receive a plurality of downlink control information messages associated with a plurality of downlink shared channel allocations. In some aspects, the critical section may include a plurality of slots, such as a first slot (Slot$_n$) of the first bandwidth part for the first downlink control information message and a first physical downlink shared channel (PDSCH), a second slot (Slot$_{n+1}$) of the first bandwidth part for a second downlink control information message and a second PDSCH, a third slot (Slot$_{n+2}$) for a transition period, one or more fourth slots (Slot$_{n+3}$, Slot$_{n+4}$, Slot$_{n+5}$, and/or the like) for the second bandwidth part, and/or the like. In some aspects, the plurality of downlink control information messages may include a first downlink control information message associated with triggering the bandwidth part switch. For example, UE 905 may receive a downlink control information message identifying the second bandwidth part, which may trigger UE 905 to transition to the second bandwidth part.

In some aspects, the plurality of downlink control information messages may include a second downlink control information message received after the first downlink control information message. For example, UE 905 may receive a second downlink control information message before radio frequency switching that identifies the first bandwidth part (e.g., to allocate the PDSCH for the first bandwidth part before RF switching), and may continue to transition to the second bandwidth part after receiving the PDSCH in the first bandwidth part. Alternatively, UE 905 may receive a second downlink control information message that identifies the second bandwidth part before RF switching. UE 905 may drop the second downlink control information message based at least in part on a bandwidth part conflict during the critical section. In some aspects, UE 905 may receive a second downlink control information message after radio frequency switching during the critical section. In this case, UE 905 may decode the second downlink control information message, such as to determine a grant for use in the second bandwidth part.

Figure 9D:
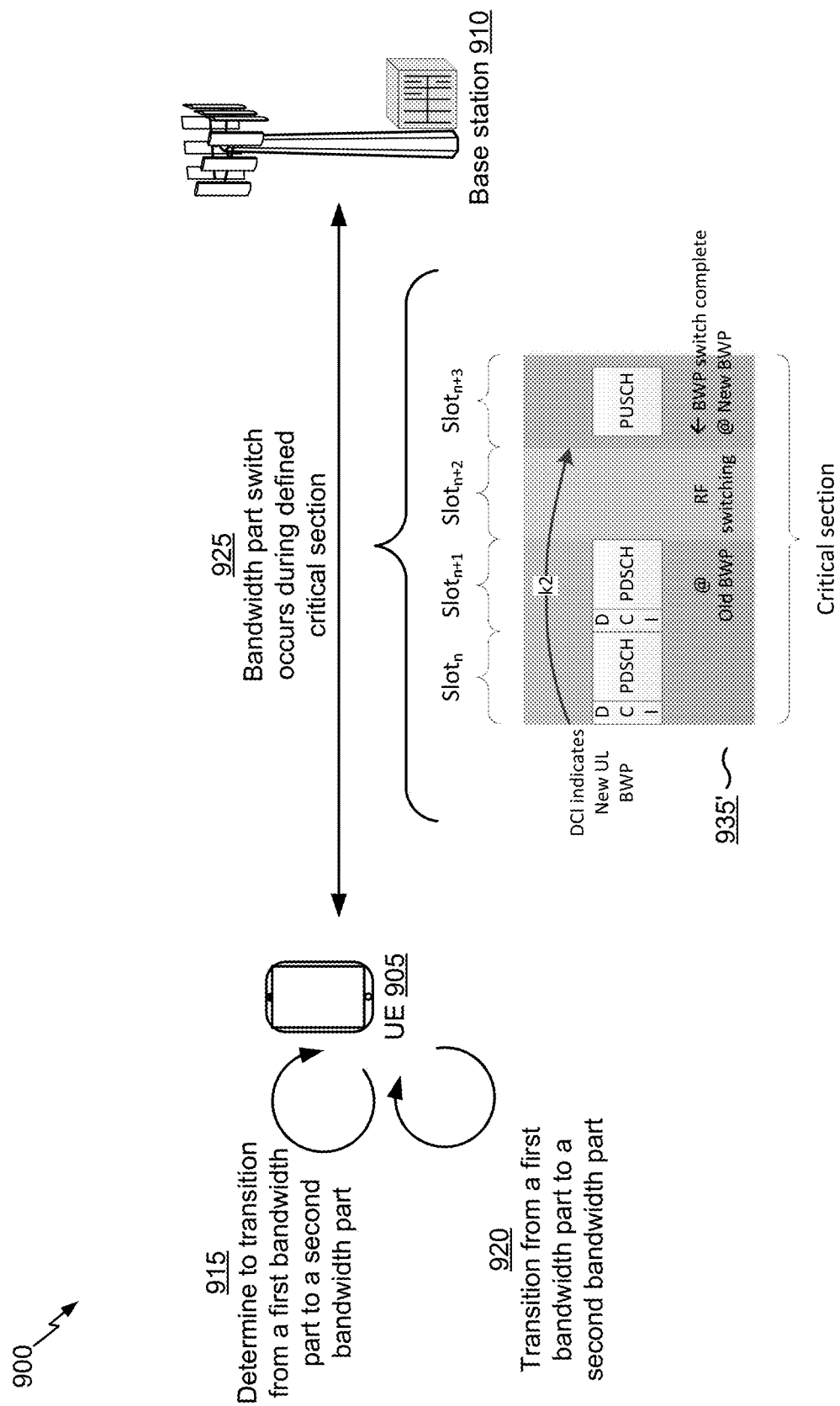

As shown in FIG. 9D, the defined critical section may be associated with a transition timeline 935' for the uplink bandwidth part switch. For example, UE 905 may receive a plurality of downlink control information messages associated with a plurality of downlink shared channel allocations. Similar to the downlink bandwidth part switch described with regard to FIG. 9C, when the second downlink control information message is not associated with the appropriate bandwidth part (for example, first bandwidth part before RF switching, and second bandwidth part after RF switching), UE 905 may drop the second downlink control information message as conflicting, may decode a grant in the second downlink control information message and drop an instruction regarding a bandwidth part switch as conflicting, and/or the like. After the critical section is complete, UE 905 may permit another bandwidth part switch, thereby avoiding an error relating to acknowledgement messages being provided on a bandwidth part that is not being monitored and/or the like. In this way, UE 905 improves bandwidth part signaling and switching relative to another technique without a defined critical section.

As indicated above, FIGS. 9A-9D are provided as examples. Other examples are possible and may differ from what was described with respect to FIGS. 9A-9D.

Figure 10A:
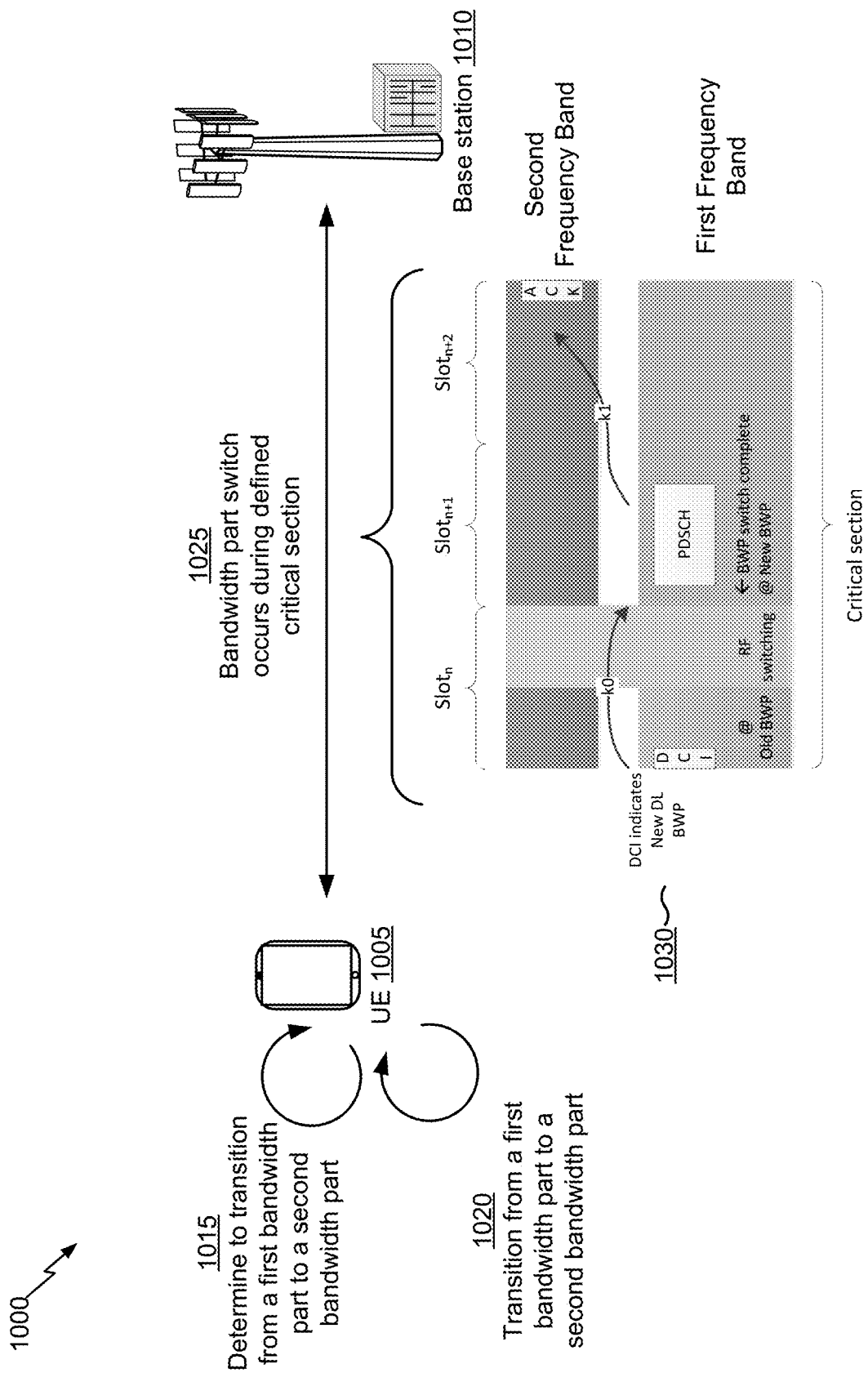
FIGS. 10A and 10B are diagrams illustrating example scenarios associated with bandwidth part management, in accordance with various aspects of the present disclosure.
Figure 10B:
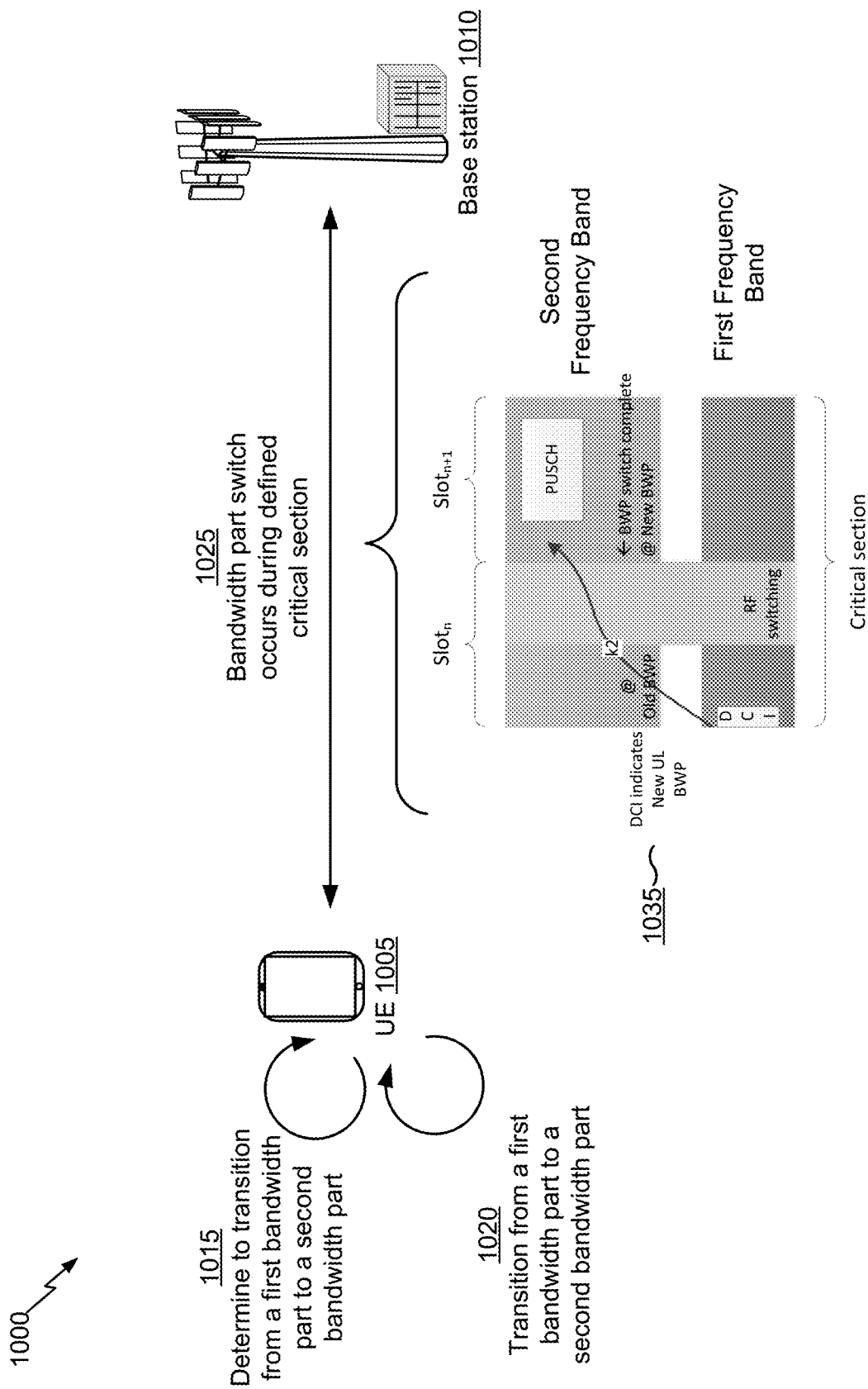

FIGS. 10A and 10B are diagrams illustrating example scenarios 1000 of bandwidth part signaling and switching, in accordance with various aspects of the present disclosure. As shown in FIG. 10A, a UE 1005 may communicate with a base station 1010. In some aspects, the UE 1005 may correspond to one or more UEs described elsewhere herein, such as UE 120 and/or the like. Additionally, or alternatively, the base station 1010 may correspond to one or more base stations described elsewhere herein, such as the base station 110 and/or the like.

As further shown in FIG. 10A, and by reference number 1015, UE 1005 may determine to transition from a first bandwidth part to a second bandwidth part in a frequency division duplex communication system with a first frequency band and a second frequency band. For example, based at least in part on receiving a downlink control information message, based at least in part on a timer expiring, and/or the like, UE 1005 may determine to transition from the first bandwidth part of the first frequency band to the second bandwidth part of the second frequency band. As shown by reference number 1020, UE 1005 may transition from the first bandwidth part to the second bandwidth part. For example, UE 1005 may transition from the first bandwidth part to the second bandwidth part after determining to transition and based at least in part on a defined critical section associated with one or more defined behaviors for UE 1005 during a bandwidth part switch.

As further shown in FIG. 10A, and by reference number 1025, the bandwidth part switch may occur during the defined critical section. The defined critical section may be associated with a transition timeline 1030 for a downlink bandwidth part switch. As shown, the critical section may be defined from a downlink control information (DCI) message received by UE 1005 and associated with triggering the bandwidth part switch from the first bandwidth part to the second bandwidth part. In some aspects, the critical section may continue to an uplink control information message including an acknowledgement message (ACK) provided by UE 1005. In some aspects, the critical section may be associated with a set of time periods, such as a first time period $k_0$ from the downlink control information message to a physical downlink shared channel allocation, and a second time period $k_1$ from the physical downlink shared channel allocation to the acknowledgment message. For example, the first period may relate to a radio frequency switching latency and the second time period may relate to a shared channel allocation.

In some aspects, the critical section may be associated with a plurality of slots. For example, the critical section may be defined for a first slot ($Slot_n$), which includes a portion of the first bandwidth part (@Old BWP) and a transition period (RF switching); a second slot ($Slot_{n+1}$), which includes a portion of the second bandwidth part (@New BWP); a third slot ($Slot_{n+2}$), which includes another portion of the second bandwidth part; and/or the like.

As shown in FIG. 10B, the defined critical section may be associated with a shortened transition timeline 1035 for an uplink bandwidth part switch. As shown, the critical section may be defined from a downlink control information (DCI) message received by UE 1005 and associated with triggering the bandwidth part switch. In some aspects, the critical section may continue to a physical uplink shared channel (PUSCH) allocated for UE 1005. In some aspects, the critical section may be associated with a time period $k_2$ from the downlink control information message to the transition to the second bandwidth part and relating to a radio frequency switching latency. In some aspects, the critical section may be associated with a plurality of slots. For example, the critical section may be defined for a first slot ($Slot_n$), which includes a portion of the first bandwidth part (@Old BWP), a transition period (RF switching); a second slot ($Slot_{n+1}$), which includes a portion of the second bandwidth part (@New BWP); and/or the like.

In some aspects, UE 1005 may be configured using transition timeline 1030 rather than transition timeline 1035 for frequency division duplexing in an uplink bandwidth part switch, a downlink bandwidth part switch, and/or the like, thereby avoiding an error relating to conflicting uplink and downlink bandwidth part messaging. For example, using a shortened critical section associated with transition timeline 1035, UE 1005 may receive conflicting messages associated with concurrent receiver and transmitter operations by UE 1005 on the downlink and uplink, respectively. In this case, UE 1005 and BS 1010 may determine to avoid concurrent receiver and transmitter operations when a grant triggers bandwidth part switching and when using the shortened critical section. In some aspects, BS 1010 may use stored information identifying a timing for a bandwidth part switch to avoid a conflict when using the shortened critical section. In this way, UE 1005 and BS 1010 may reduce a likelihood of an error relative to another technique using a shortened critical section.

In some aspects, BS 1010 and UE 1005 may permit only a single bandwidth part switch for frequency division duplexing during a critical section. Additionally, or alternatively, BS 1010 and UE 1005 may permit a plurality of concurrent bandwidth part switches for frequency division duplexing. For example, UE 1005 may perform an uplink bandwidth part switch and a downlink bandwidth part switch concurrently. In this case, when $k_2$ and $k_0$ differ by a threshold amount, BS 1010 may detect a downlink control information message associated with an uplink grant (an UL DCI message) from UE 1005 on the first bandwidth part. Alternatively, when $k_2$ and $k_0$ do not differ by the threshold amount, BS 1010 may use a blind detection procedure to attempt to detect the acknowledgement (ACK) message from UE 1005 on the first bandwidth part and the second bandwidth part.

As indicated above, FIGS. 10A and 10B are provided as examples. Other examples are possible and may differ from what was described with respect to FIGS. 10A and 10B.

Figure 11A:
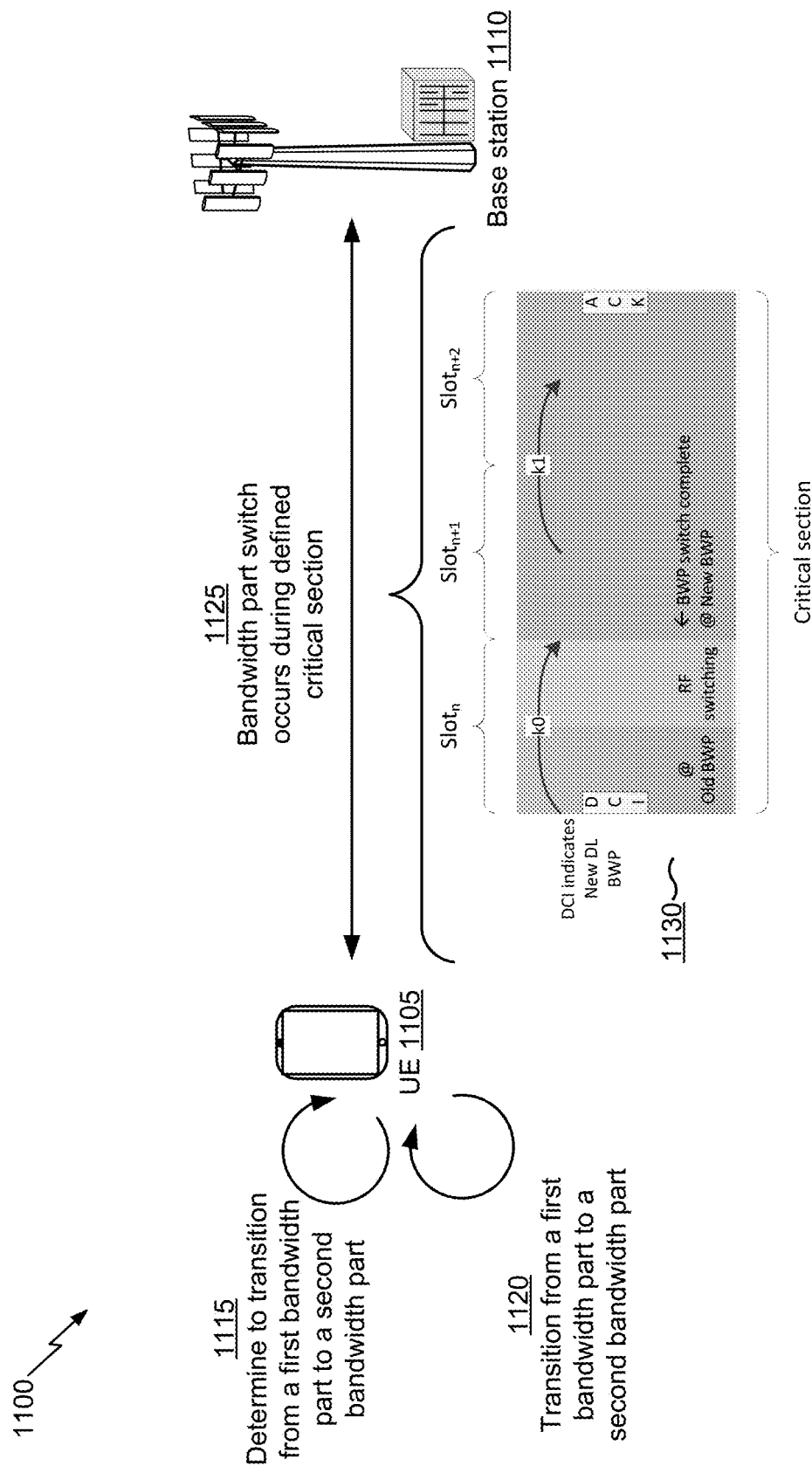
FIGS. 11A and 11B are diagrams illustrating example scenarios associated with bandwidth part management, in accordance with various aspects of the present disclosure.
Figure 11B:
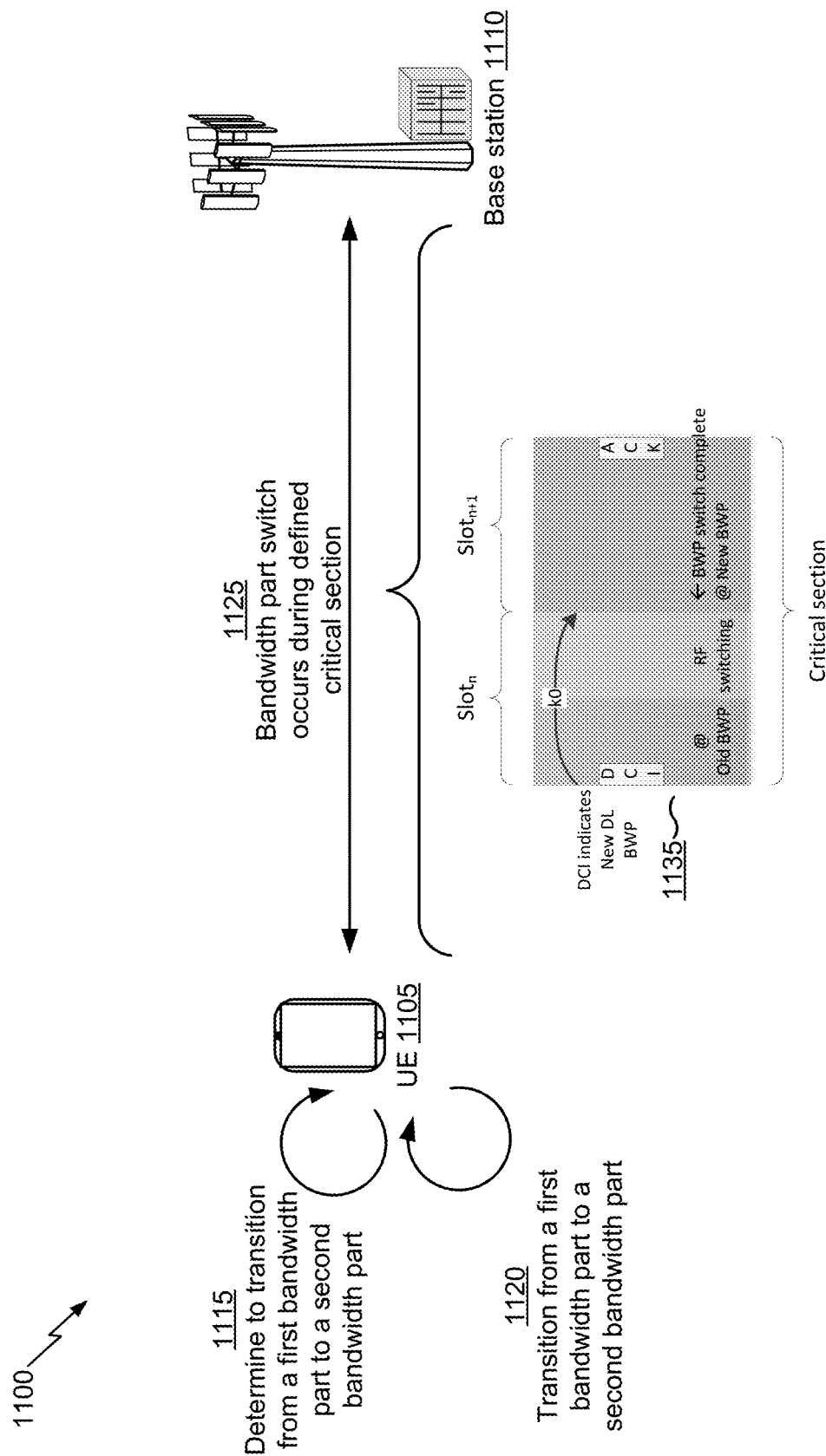

FIGS. 11A and 11B are diagrams illustrating example scenarios 1100 of bandwidth part signaling and switching, in accordance with various aspects of the present disclosure. As shown in FIG. 11A, a UE 1105 may communicate with a base station 1110. In some aspects, the UE 1105 may correspond to one or more UEs described elsewhere herein, such as UE 120 and/or the like. Additionally, or alternatively, the base station 1110 may correspond to one or more base stations described elsewhere herein, such as the base station 110 and/or the like.

As further shown in FIG. 11A, and by reference number 1115, UE 1105 may determine to transition from a first bandwidth part to a second bandwidth part in, for example, a time division duplex communication system. For example, based at least in part on receiving a downlink control information message, based at least in part on a timer expiring, and/or the like, UE 1105 may determine to transition from the first bandwidth part to the second bandwidth part. As shown by reference number 1120, UE 1105 may transition from the first bandwidth part to the second bandwidth part. For example, UE 1105 may transition from the first bandwidth part to the second bandwidth part after determining to transition and based at least in part on a defined critical section associated with one or more defined behaviors for UE 1105 during a bandwidth part switch.

As further shown in FIG. 11A, and by reference number 1125, the bandwidth part switch may occur during the defined critical section. The defined critical section may be associated with a transition timeline 1130 for a downlink bandwidth part switch. As shown, the critical section may be defined from a downlink control information (DCI) message received by UE 1105 and associated with triggering the bandwidth part switch. In some aspects, the critical section may continue to an uplink control information message including an acknowledgement message (ACK) provided by UE 1105. In some aspects, the critical section may be associated with a set of time periods, such as a first time period $k_0$, and a second time period $k_1$.

In some aspects, UE 1105 may receive a downlink control information message associated with triggering the bandwidth part switch and without a resource allocation (e.g., for a physical downlink shared channel). In some aspects, UE 1105 may define the critical section based at least in part on $k_0$ and $k_1$ without the resource allocation. For example, UE 1105 may determine a period of time that would be allocated for $k_0$ and $k_1$ if a resource allocation had been provided for a physical downlink shared channel, and may use the period of time for the critical section. In this case, $k_0$ and $k_1$ represent a delay from receiving the downlink control information message to the acknowledgement message.

As shown in FIG. 11B, and by transition timeline 1135, UE 1105 may define the critical section based at least in part on $k_0$ and not $k_1$. For example, based at least in part on determining that physical downlink shared channel processing time is not needed (e.g., based at least in part on a physical downlink shared channel allocation not being provided in the downlink control information message), UE 1105 may not allocate time for physical downlink shared channel processing for the critical section. In this case, the critical section may occur for a shortened period of time relative to the critical section of transition timeline 1130.

In some aspects, UE 1105 may determine to transmit an acknowledgement message on the first bandwidth part and may delay the bandwidth part switch based at least in part on receiving a downlink control information message without a resource allocation. In some aspects, UE 1105 may not perform a bandwidth part switch based at least in part on receiving a downlink control information message without a resource allocation. For example, for an uplink bandwidth part switch, UE 1105 may not perform the bandwidth part switch after receiving the downlink control information message without a resource allocation, thereby avoiding an error relating from being unable to transmit an acknowledgement message.

In some aspects, such as for frequency division duplexing, UE 1105 may determine, based at least in part on a received downlink control information message, to transition from the first bandwidth part to the second bandwidth part on a downlink, on an uplink, on both the downlink and the uplink (e.g., for paired bandwidth parts), and/or the like. For example, on a downlink control information message with no resource allocation, UE 1105 may determine that a field is reused (e.g., a modulation and control scheme field, a redundancy version field, a hybrid automatic repeat request field, and/or the like) to identify an uplink bandwidth part. In this case, UE 1105 may provide an acknowledgement for the downlink control information message using a configured uplink control channel (e.g., a physical uplink control channel).

As indicated above, FIGS. 11A and 11B are provided as examples. Other examples are possible and may differ from what was described with respect to FIGS. 11A and 11B.

Figure 12:
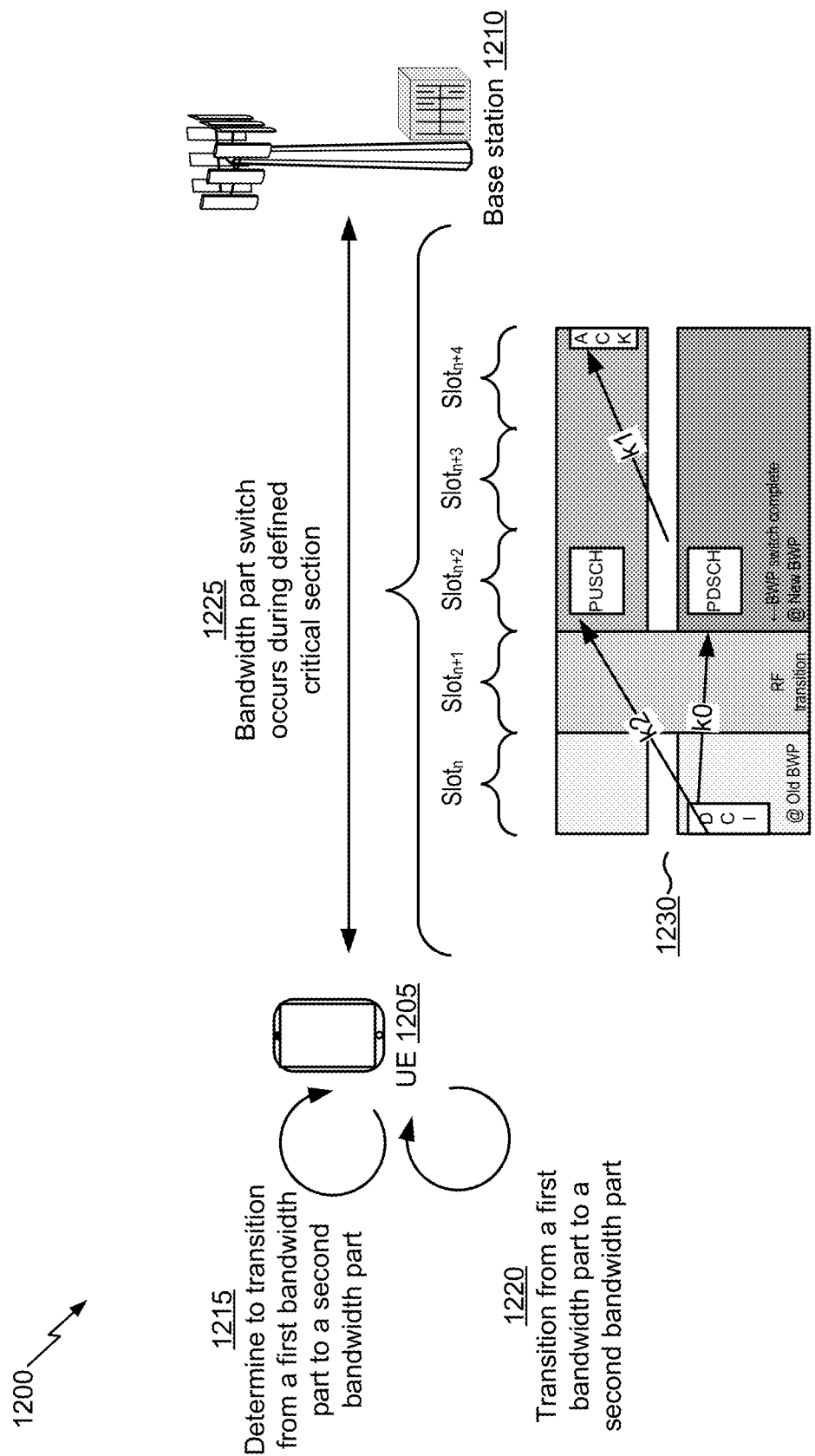
FIG. 12 is a diagram illustrating an example scenario associated with bandwidth part management, in accordance with various aspects of the present disclosure.

FIG. 12 is a diagram illustrating an example scenario 1200 of bandwidth part signaling and switching, in accordance with various aspects of the present disclosure. As shown in FIG. 12, a UE 1205 may communicate with a base station 1210. In some aspects, the UE 1205 may correspond to one or more UEs described elsewhere herein, such as UE 120 and/or the like. Additionally, or alternatively, the base station 1210 may correspond to one or more base stations described elsewhere herein, such as the base station 110 and/or the like.

As further shown in FIG. 12, and by reference number 1215, UE 1205 may determine to transition from a first bandwidth part to a second bandwidth part. For example, based at least in part on receiving a downlink control information message, UE 1205 may determine to transition from the first bandwidth part to the second bandwidth part. In this case, UE 1205 may be configured to receive the downlink control information message during a first three OFDM symbols of a slot. In some aspects, BS 1210 may be configured not to provide, and UE 1205 may be configured not to receive a plurality of downlink control information messages. For example, UE 1205 may be configured to receive a single bandwidth part switch triggering downlink control information message in a single slot. In some aspects, for a paired spectrum case, UE 1205 may be configured to receive up to two bandwidth part switch triggering downlink control information messages (at most one for each link direction) in a single slot. Additionally, or alternatively UE 1205 may be configured such that a single bandwidth part switch triggering downlink control information message is active (e.g., a plurality of bandwidth part switch triggering downlink control information messages do not occur concurrently).

In some aspects, UE 1205 and BS 1210 may utilize a handshake exchange to synchronize initiation and completion of a bandwidth part switch. For example, when using a first downlink control information message format, BS 1210 may confirm the bandwidth part switch based at least in part on receiving an acknowledgement message for a downlink shared channel from UE 1205. Additionally, or alternatively, for a second downlink control information message format, BS 1210 may confirm the bandwidth part switch based at least in part on decoding an uplink shared channel in a bandwidth part to which UE 1205 switches.

As further shown in FIG. 12, and by reference number 1220, UE 1205 may transition from the first bandwidth part to the second bandwidth part. For example, UE 1205 may transition from the first bandwidth part to the second bandwidth part after determining to transition and based at least in part on a defined critical section associated with one or more defined behaviors for UE 1205 during a bandwidth part switch.

As further shown in FIG. 12, and by reference number 1225, the bandwidth part switch may occur during the defined critical section. The defined critical section may be associated with a transition timeline 1230 for a downlink bandwidth part switch. As shown, the critical section may be defined (i.e., to be in effect) from a downlink control information (DCI) message received by UE 1205 and associated with triggering the bandwidth part switch. Additionally, or alternatively, the critical section may be defined from a last OFDM symbol of a PDCCH that conveys the downlink control information message. Additionally, or alternatively, the critical section may be defined from a beginning of a subframe or half-subframe immediately after an expiration of a bandwidth part timer. In some aspects, the critical section may be defined to be in effect from a bandwidth part switch transition time start.

In some aspects, the critical section may continue (i.e., to be in effect) until an uplink control information message including an acknowledgement message (ACK) is provided by UE 1205. Additionally, or alternatively, the critical section may be defined to continue until a beginning of a slot indicated by $k_0$ (e.g., for downlink bandwidth part switching) or $k_2$ (for uplink bandwidth part switching). Additionally, or alternatively, the critical section may be defined to continue until a slot during which UE 1205 may receive downlink signals or transmit uplink signals. In some aspects, the critical section may be defined to be in effect until an end of a last symbol of an acknowledgement message corresponding to a downlink shared channel scheduled using the downlink control information message that triggered the bandwidth part switch. In some aspects, the critical section may be defined to be in effect until an end of a last symbol of an uplink shared channel scheduled using the downlink control information message that triggered the bandwidth part switch.

In some aspects, during the critical section, UE 1205 may not receive another bandwidth part switch triggering downlink control information message, a scheduling downlink control information associated with a link direction for which the bandwidth part switch is occurring, and/or the like. In some aspects, UE 1205 may be configured to not transmit uplinks signals during the critical section (e.g., during the bandwidth part switch). Similarly, BS 1210 may be configured not to transmit, and UE 1205 may be configured not to receive downlink signals during the critical section.

In some aspects, the critical section may be associated with a set of time periods, such as a first time period $k_0$, a second time period $k_1$, a third time period $k_2$, and/or the like. In some aspects, when a time period (e.g., $k_0$ or $k_2$) is defined as less than a threshold (e.g., less than an amount that accommodates a latency of a bandwidth part switch), UE 1205 may drop the bandwidth part switch triggering downlink control information message, and may not complete the bandwidth part switch.

In some aspects, UE 1205 may drop a scheduled transmission based at least in part on a bandwidth part switch occurring. For example, when a bandwidth part switch starts after a downlink scheduling downlink control information message and before a downlink shared channel (e.g., a PDSCH) scheduled by the downlink scheduling downlink control information message, UE 1205 may drop the downlink shared channel. Additionally, or alternatively, when a bandwidth part switch starts after an uplink scheduling downlink control information message and before an uplink shared channel (e.g., a PUSCH) scheduled by the uplink scheduling downlink control information message, UE 1205 may drop the uplink shared channel.

In some aspects, UE 1205 may drop an aperiodic channel state information or a semi-persistent channel state information message that is scheduled before a bandwidth part switch to occur after the bandwidth part switch. In some aspects, UE 1205 may drop a sounding reference signal that is requested to occur during a bandwidth part switch, after a bandwidth part switch, during the critical section, after the critical section, and/or the like. In some aspects, when a uplink control channel (e.g., a PUCCH) resource for a periodic channel state information reporting message or semi-persistent channel state information reporting message is unavailable during a bandwidth part switch or after a bandwidth part switch, UE 1205 may forgo reporting the channel state information. In some aspects, UE 1205 may forgo transmitting an acknowledgement message for a downlink shared channel (e.g., a PDSCH) transmission of a downlink bandwidth part switch after a bandwidth part switch (e.g., an uplink bandwidth part switch or a downlink bandwidth part switch).

As indicated above, FIG. 12 is provided as an example. Other examples are possible and may differ from what was described with respect to FIG. 12.

FIG. 1300 is a diagram illustrating an example process 1300 performed, for example, by a UE, in accordance with various aspects of the present disclosure. Example process 1300 is an example where a UE (e.g., UE 120, UE 905, UE 1005, UE 1105, UE 1205, and/or the like) performs bandwidth part signaling and switching.

Figure 13:
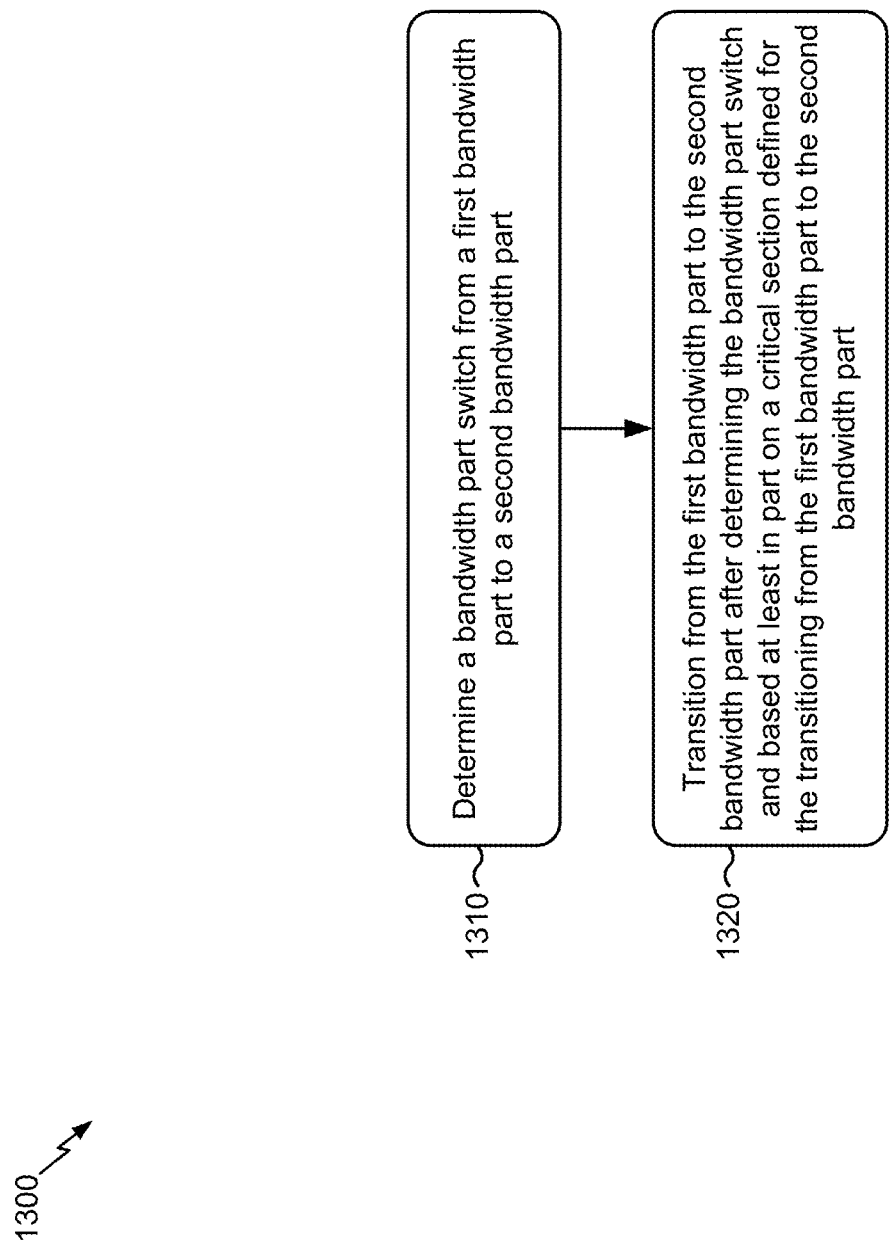
FIG. 13 is a diagram illustrating an example process performed, for example, by a user equipment, in accordance with various aspects of the present disclosure.

As shown in FIG. 13, in some aspects, process 1300 may include determining a bandwidth part switch from a first bandwidth part to a second bandwidth part (block 1310). For example, the UE (e.g., using controller/processor 280) may determine the bandwidth part switch from the first bandwidth part to the second bandwidth part, as described above.

As further shown in FIG. 13, in some aspects, process 1300 may include transitioning from the first bandwidth part to the second bandwidth part after determining the bandwidth part switch and based at least in part on a critical section defined for the transitioning from the first bandwidth part to the second bandwidth part (block 1320). For example, the UE (e.g., using antenna 252, DEMOD 254, MIMO detector 256, receive processor 258, transmit processor 264, TX MIMO processor 266, MOD 254, antenna 252, controller/processor 280, and/or the like) may transition from the first bandwidth part to the second bandwidth part after determining the bandwidth part switch and based at least in part on the critical section defined for the transitioning from the first bandwidth part to the second bandwidth part, as described above.

Process 1300 may include additional aspects, such as any single aspect and/or any combination of aspects described below and/or in connection with one or more other processes described elsewhere herein.

In some aspects, the bandwidth part switch is an uplink bandwidth part switch or a downlink bandwidth part switch. In some aspects, the UE is configured to determine the bandwidth part switch based at least in part on receiving a downlink control information message. In some aspects, the UE does not receive or transmit during the critical section. In some aspects, the critical section is defined from an end of a third symbol of a slot in which the UE receives a downlink control channel including a downlink control information message to a beginning of a slot indicated by an offset value identified by the downlink control information message.

In some aspects, the critical section is defined for at least one carrier of a plurality of carriers. In some aspects, the critical section is defined to end at a start of a slot in which an uplink shared channel is scheduled. In some aspects, the critical section is defined to end at a start of a slot in which a downlink shared channel is scheduled. In some aspects, the UE is configured to drop periodic channel state information reporting during the bandwidth part switch or after the bandwidth part switch.

In some aspects, the UE is operating in a time division duplex or a frequency division duplex communication system. In some aspects, the bandwidth part switch is related to at least one of a downlink grant or an uplink grant. In some aspects, the bandwidth part switch is not to occur concurrently with another bandwidth part switch.

In some aspects, a slot includes an indication of the bandwidth part switch and does not include another indication of another bandwidth part switch for a same link direction. In some aspects, the critical section is defined from a downlink control information message associated with indicating the bandwidth part switch to an uplink control information message including an acknowledgement. In some aspects, the critical section is defined from a bandwidth part switch transition time start to a last symbol of the acknowledgement.

In some aspects, the critical section is defined from a downlink control information message associated with indicating the bandwidth part switch to an uplink shared channel. In some aspects, the critical section is defined from a bandwidth part switch transition time start to a last symbol of an uplink shared channel. In some aspects, the UE is not configured to receive another bandwidth part switch downlink control information during the critical section.

In some aspects, the UE is not configured to receive a scheduling downlink control information message associated with a link direction corresponding to the bandwidth part switch during the critical section. In some aspects, the UE is configured to drop a downlink control information message associated with the bandwidth part switch based at least in part on a length of time of the critical section. In some aspects, the bandwidth part switch is a downlink bandwidth part switch and is started after a downlink scheduling downlink control information message and before a corresponding downlink shared channel, and wherein the UE is configured to drop the downlink shared channel based at least in part on the bandwidth part switch not being triggered by the downlink scheduling downlink control information.

In some aspects, the bandwidth part switch is an uplink bandwidth part switch and is started after an uplink scheduling downlink control information message and before a corresponding uplink shared channel, and wherein the UE is configured to drop the uplink shared channel based at least in part on the bandwidth part switch not being triggered by the uplink scheduling downlink control information. In some aspects, the UE is configured to drop a sounding reference signal request during the bandwidth part switch or after the bandwidth part switch. In some aspects, the UE is configured to drop periodic channel state information reporting during the bandwidth part switch or after the bandwidth part switch.

In some aspects, the UE is configured to not transmit an acknowledgement message corresponding to a downlink shared channel transmission of a downlink bandwidth part before the bandwidth part switch. In some aspects, a first downlink control information message is received to trigger the bandwidth part switch and a second downlink control information message, received after the first downlink control information message and during the critical section, is associated with the second bandwidth part. In some aspects, a first downlink control information message is received to trigger the bandwidth part switch and a second downlink control information message, received after the first downlink control information message and during the critical section, is associated with the first bandwidth part and is dropped.

In some aspects, a first downlink control information message is received to trigger the bandwidth part switch and a second downlink control message is received before the bandwidth part switch. In some aspects, another bandwidth part switch occurs after the critical section is complete. In some aspects, the critical section is defined from a downlink control information message associated with indicating the bandwidth part switch to a downlink shared channel.

In some aspects, a downlink grant and an uplink grant are capable of triggering respective bandwidth part switches during the critical section. In some aspects, a message from the UE is capable of being detected in the first bandwidth part and the second bandwidth part. In some aspects, a message from the UE is capable of being detected in the first bandwidth part and not the second bandwidth part.

In some aspects, the bandwidth part switch is triggered without a resource allocation. In some aspects, the critical section is defined with a slot for a downlink shared channel that is not allocated. In some aspects, the critical section is defined without at least a portion of a slot for a downlink shared channel that is not allocated.

In some aspects, an acknowledgement is provided on the first bandwidth part and the bandwidth part switch is delayed for an acknowledgement period. In some aspects, a bandwidth part timer associated with the first bandwidth part is associated with a threshold minimum value. In some aspects, the bandwidth part switch is triggered based at least in part on a timer.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one" of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   determining, by a user equipment (UE), a bandwidth part switch from a first bandwidth part to a second bandwidth part; and
   transitioning, by the UE, from the first bandwidth part to the second bandwidth part after determining the bandwidth part switch and based at least in part on a critical section defined for the transitioning from the first bandwidth part to the second bandwidth part, wherein the critical section is defined from an end of a symbol of a slot in which the UE receives a downlink control channel including a downlink control information message to a beginning of a different slot, and wherein the beginning of the different slot is indicated by an offset value identified by the downlink control information message.

2. The method of claim 1, wherein the bandwidth part switch is an uplink bandwidth part switch or a downlink bandwidth part switch.

3. The method of claim 1, wherein the UE is configured to determine the bandwidth part switch based at least in part on receiving the downlink control information message.

4. The method of claim 1, wherein the UE does not receive or transmit during the critical section.

5. The method of claim 1, wherein the symbol is a third symbol of the slot.

6. The method of claim 1, wherein the critical section is defined for two or more carriers of a plurality of carriers based at least in part on the bandwidth part switch for a carrier of the plurality of carriers.

7. The method of claim 1, wherein the different slot is in which an uplink shared channel is scheduled.

8. The method of claim 1, wherein the different slot is in which a downlink shared channel is scheduled.

9. The method of claim 1, wherein the downlink control information message is associated with indicating the bandwidth part switch to an uplink shared channel.

10. The method of claim 1, wherein the UE is not configured to receive another bandwidth part switch downlink control information during the critical section.

11. The method of claim 1, wherein the UE is not configured to receive a scheduling downlink control information message associated with a link direction corresponding to the bandwidth part switch during the critical section.

12. The method of claim 1, wherein the UE is configured to drop the downlink control information message based at least in part on a length of time of the critical section.

13. The method of claim 1, wherein the UE is configured to drop a sounding reference signal request during the bandwidth part switch or after the bandwidth part switch.

14. The method of claim 1, wherein the UE is configured to drop periodic channel state information reporting during the bandwidth part switch or after the bandwidth part switch.

15. A user equipment (UE) for wireless communication, comprising:
   a memory; and
   one or more processors operatively coupled to the memory, the memory and the one or more processors configured to:
      determine a bandwidth part switch from a first bandwidth part to a second bandwidth part; and
      transition from the first bandwidth part to the second bandwidth part after determining the bandwidth part switch and based at least in part on a critical section defined for the transitioning from the first bandwidth part to the second bandwidth part, wherein the critical section is defined from an end of a symbol of a slot in which the UE receives a downlink control channel including a downlink control information message to a beginning of a different slot, and wherein the beginning of the different slot is indicated by an offset value identified by the downlink control information message.

16. The UE of claim 15, wherein the bandwidth part switch is an uplink bandwidth part switch or a downlink bandwidth part switch.

17. The UE of claim 15, wherein the UE is configured to determine the bandwidth part switch based at least in part on receiving the downlink control information message.

18. The UE of claim 15, wherein the UE does not receive or transmit during the critical section.

19. The UE of claim 15, wherein the symbol is a third symbol of the slot.

20. A non-transitory computer-readable medium storing one or more instructions for wireless communication, the one or more instructions comprising:
   one or more instructions that, when executed by one or more processors of a user equipment (UE), cause the one or more processors to:
      determine a bandwidth part switch from a first bandwidth part to a second bandwidth part; and
      transition from the first bandwidth part to the second bandwidth part after determining the bandwidth part switch and based at least in part on a critical section defined for the transitioning from the first bandwidth part to the second bandwidth part, wherein the critical section is defined from an end of a symbol of a slot in which the UE receives a downlink control channel including a downlink control information message to a beginning of a different slot, and wherein the beginning of the different slot is indicated by an offset value identified by the downlink control information message.

21. The non-transitory computer-readable medium of claim 20, wherein the bandwidth part switch is an uplink bandwidth part switch or a downlink bandwidth part switch.

22. The non-transitory computer-readable medium of claim 20, wherein the UE is configured to determine the bandwidth part switch based at least in part on receiving the downlink control information message.

23. The non-transitory computer-readable medium of claim 20, wherein the UE does not receive or transmit during the critical section.

24. The non-transitory computer-readable medium of claim 20, wherein the symbol is a third symbol of the slot.

25. An apparatus for wireless communication, comprising:
   means for determining a bandwidth part switch from a first bandwidth part to a second bandwidth part; and means for transitioning from the first bandwidth part to the second bandwidth part after determining the bandwidth part switch and based at least in part on a critical section defined for the transitioning from the first bandwidth part to the second bandwidth part, wherein the critical section is defined from an end of a symbol of a slot in which the apparatus receives a downlink control channel including a downlink control information message to a beginning of a different slot, and wherein the beginning of the different slot is indicated by an offset value identified by the downlink control information message.

26. The apparatus of claim 25, wherein the bandwidth part switch is an uplink bandwidth part switch or a downlink bandwidth part switch.

27. The apparatus of claim 25, wherein the apparatus is configured to determine the bandwidth part switch based at least in part on receiving the downlink control information message.

28. The apparatus of claim 25, wherein the apparatus does not receive or transmit during the critical section.

29. The apparatus of claim 25, wherein the symbol is a third symbol of the slot.

30. The apparatus of claim 25, wherein the critical section is defined for two or more carriers of a plurality of carriers based at least in part on the bandwidth part switch for a carrier of the plurality of carriers.

* * * * *